(12) United States Patent
Fujioka et al.

(10) Patent No.: US 7,937,763 B2
(45) Date of Patent: May 3, 2011

(54) PROCESSOR AND PROCESSING APPARATUS PERFORMING VIRUS PROTECTION

(75) Inventors: Soichiro Fujioka, Osaka (JP); Kazuhiko Yamauchi, Osaka (JP); Masao Nonaka, Osaka (JP); Tomokazu Kanamaru, Osaka (JP); Motoji Ohmori, Osaka (JP); Yoshiaki Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 881 days.

(21) Appl. No.: 11/884,947

(22) PCT Filed: Feb. 17, 2006

(86) PCT No.: PCT/JP2006/302855
§ 371 (c)(1),
(2), (4) Date: Aug. 23, 2007

(87) PCT Pub. No.: WO2006/090647
PCT Pub. Date: Aug. 31, 2006

(65) Prior Publication Data
US 2008/0155695 A1 Jun. 26, 2008

(30) Foreign Application Priority Data
Feb. 25, 2005 (JP) ................. 2005-051443

(51) Int. Cl.
*G08B 23/00* (2006.01)
(52) U.S. Cl. .......................... 726/24; 726/22
(58) Field of Classification Search .................... 726/22, 726/24, 34, 23, 25; 713/188; 725/109, 110, 725/133, 134; 707/654
See application file for complete search history.

(56) References Cited

U.S. PATENT DOCUMENTS

| 6,701,440 | B1 * | 3/2004 | Kim et al. ...................... 726/24 |
| 2003/0187711 | A1 | 10/2003 | Komai |
| 2003/0200460 | A1 | 10/2003 | Morota et al. |
| 2004/0230318 | A1 | 11/2004 | Shimizu |
| 2006/0130144 | A1 * | 6/2006 | Wernicke ...................... 726/24 |

FOREIGN PATENT DOCUMENTS

| JP | 11-134190 | 5/1999 |
| JP | 2003-288224 | 10/2003 |
| JP | 2003-323312 | 11/2003 |
| JP | 2003-348113 | 12/2003 |
| JP | 2004-178559 | 6/2004 |

* cited by examiner

*Primary Examiner* — Edward Zee
(74) *Attorney, Agent, or Firm* — Wenderoth, Lind & Ponack, L.L.P.

(57) ABSTRACT

A processing apparatus is connected to a network and has a content recording/playback function. The processing apparatus stores therein, in correspondence, (i) statuses of the recording/playback process and (ii) computer virus-handling processes to be performed if a detection unit detects a computer virus. If the computer virus is detected, the processing apparatus performs one of the computer virus-handling processes in correspondence with one of the statuses of the recording/playback processes.

2 Claims, 18 Drawing Sheets

FIG.4

| APPARATUS STATUS 1611 | USER LEVEL 1612 | COUNTERMEASURE PROCEDURE 1613 |
|---|---|---|
| RECORDING SCHEDULED | HIGH | ACTIVATE NAVIGATION 01 |
| | MIDDLE | ACTIVATE NAVIGATION 02 |
| | LOW | ACTIVATE NAVIGATION 03 |
| RECORDING | HIGH | DISPLAY MESSAGE 11 |
| | MIDDLE OR LOW | DISPLAY MESSAGE 12 |
| PLAYING BD | HIGH | EJECT DISC, DISPLAY MESSAGE 31 |
| | MIDDLE | EJECT DISC, DISPLAY MESSAGE 32 |
| | LOW | EJECT DISC, DISPLAY MESSAGE 33, SET STARTUP PASSWORD, SEND EMAIL, SHUT DOWN POWER |
| | | |

| MESSAGE NUMBER | MESSAGE |
|---|---|
| ... | ... |
| 11 | VIRUS IS DETECTED. PLEASE CHECK IF ALL SETTINGS ARE KEPT UNALTERED. |
| 12 | VIRUS IS DETECTED. HDD RECORDING FUNCTION IS DEACTIVATED FOR SAFETY. TO REACTIVATE.... |
| ... | ... |
| 31 | VIRUS IS DETECTED. PLAYBACK FUNCTION IS DEACTIVATED FOR SAFETY. |
| 32 | VIRUS IS DETECTED. PLEASE CHECK IF ALL SETTINGS ARE KEPT UNALTERED. |
| 33 | VIRUS IS DETECTED. PLAYBACK IS STOPPED. POWER WILL BE SHUT DOWN IN 5 MINUTES. E-MAIL HAS BEEN SENT TO "User xx." |

FIG.6

| USER IDENTIFIER 1631 | USER LEVEL 1632 | USER E-MAIL ADDRESS 1633 | 1630 |
|---|---|---|---|
| User01 | HIGH | User01@xxx.or.jp | |
| User02 | MIDDLE | User02@xxx.or.jp | |
| User03 | LOW | User03@xxx.or.jp | |

FIG.7

| AT-HOME TIME 1641 | AT-HOME USER 1642 | 1640 |
|---|---|---|
| 0:00~7:00 | User01 | |
| | User02 | |
| | User03 | |
| 7:00~16:00 | User03 | |
| 16:00~21:00 | User02 | |
| | User03 | |
| 22:00~24:00 | User01 | |
| | User02 | |

FIG.8

| DATE | RECORDING TIME | CHANNEL | PROGRAM NAME |
|---|---|---|---|
| ... | ... | ... | ... |
| 2/13 | 10:30~11:00 | 10 | TODAY'S COOKING |
| 2/13 | 21:00~22:00 | 8 | DRAMA SERIES B (EPISODE 3) |
| 2/13 | 23:00~23:55 | 21 | WORLD BUSINESS NEWS |
| 2/14 | 21:00~22:00 | 8 | DRAMA SERIES B (EPISODE 4) |
| 2/14 | 23:00~23:55 | 21 | WORLD BUSINESS NEWS |
| 2/15 | 1:15~1:45 | 6 | COMEDY |

FIG.19

| APPARATUS NAME | APPARATUS ADDRESS | CONNECTION STATUS |
|---|---|---|
| RECORDING APPARATUS 1000 | 10.10.1.0 | CONNECTED |
| RECORDING APPARATUS 2000 | 10.10.2.0 | DISCONNECTED |
| PERSONAL COMPUTER 3000 | 10.10.3.0 | DISCONNECTED |
| | | |

PROCESSOR AND PROCESSING APPARATUS PERFORMING VIRUS PROTECTION

BACKGROUND OF THE INVENTION

1. Field of Invention

The present invention relates to an anti-computer virus technology for a processing apparatus in a network. The present invention relates more specifically to technology for improving efficiency of computer virus-handling operations when a computer virus infection is detected.

2. Description of the Related Art

Recent years have witnessed increasing cases of computers being damaged by computer viruses (hereafter viruses) by way of the Internet and other infection routes. The computer viruses are also evolving into new forms. Accordingly, new species of viruses are found on a daily basis.

In order to establish reliability and security of using the computers, various types of anti-virus software, namely vaccines, are developed for preventing the viruses from entering into the computers and detecting and removing the viruses that have entered into the computers.

A recent trend in households is to give information processing functions to some home electrical appliances. Accordingly, engineers have developed technologies to connect the home electrical appliances to the Internet, provide interactivity to in-home apparatuses by networking them to one another, etc. One example of such technologies is a DVD (Digital Versatile Disc) recorder having a networking function. Such a DVD recorder can request another recording apparatus that is networked thereto to perform video recording.

Under such circumstances, more people are in danger of getting infected by viruses, whether they are using computers or not.

That is to say, even when people are merely watching TV or using other home electrical appliances, they are in danger of having virus infections via the Internet and recording media such as a DVD.

BRIEF SUMMARY OF THE INVENTION

The Problems the Invention is Going to Solve

In most households, it is not the case that all users (i.e., all family members) can take countermeasures against the virus infections, or that a family member who can take such countermeasures is always at home.

Still, it is unsafe to leave the home electrical appliances and other apparatuses as they are while being infected by the viruses, because doing so may lead to appliance/apparatus malfunctions, or may further damage other apparatuses.

In light of the above, it is an object of the present invention to provide an apparatus that can, when detecting a virus in an in-home information apparatus, prevent spread of virus-related damages promptly and recover the virus-infected information apparatus as much as possible.

Here, the phrase "the apparatus that can recover the virus-infected information apparatus" means the apparatus can not only recover the virus-infected information apparatus after the virus infection, but also take proactive measures to make the recovery easier.

Means to Solve the Problems

To solve the aforementioned problems, the present invention is a processing apparatus having a content recording/playback function and being connected to a network, the processing apparatus comprising: a detection unit operable to detect a virus; an apparatus status retrieval unit operable to retrieve one of statuses of a recording/playback process; a countermeasure storage unit storing therein, in correspondence, (i) the statuses of the recording/playback process and (ii) virus-handling processes to be performed if the detection unit detects the virus; and a countermeasure unit operable to, if the detection unit detects the virus, perform one of the virus-handling processes in correspondence with the retrieved status of the recording/playback process.

Effects of the Invention

This above-mentioned structure enables the processing apparatus to determine, depending on a status of the processing apparatus in which the virus is detected, the countermeasure to be taken after the virus is removed. This way the processing apparatus can carry out more appropriate countermeasures against the virus while minimizing damages caused by the virus.

The processing apparatus may further include a user information acquisition unit operable to acquire user information pieces, each being information regarding a different one of a plurality of users of the processing apparatus, wherein (i) the countermeasure storage unit further stores therein the user information pieces in correspondence with the virus-handling processes, and (ii) if the detection unit detects the virus, the countermeasure unit performs one of the virus-handling processes in correspondence with the acquired user information pieces and with the retrieved status of the recording/playback process.

With the above structure, the processing apparatus determines, in accordance with the information regarding each user of the processing apparatus, a countermeasure to be taken after the virus is removed. This way, more appropriate, per-user countermeasures can be taken. For example, in the case where a user of the processing apparatus is a child, the processing apparatus carries out a countermeasure to shut off the power of the processing apparatus to prevent various accidents such as deletion or theft of data stored in the apparatus.

The statuses of the recording/playback process include a recording scheduled status that is a status where a recording has been scheduled. One of the virus-handling processes that is stored, in correspondence with the recording scheduled status, in the countermeasure storage unit is a process to send information indicating the scheduled recording to outside of the processing apparatus.

The above structure enables the processing apparatus to automatically request another apparatus to perform a scheduled recording. This way the scheduled recording will be performed for sure, even when the recording apparatus that was originally supposed to perform the recording becomes unusable due to virus infection. Furthermore, the above structure gives a user the ability to check contents of broadcast programs to be recorded with use of another recording apparatus that is uninfected by the virus. This way, the following situations can be avoided: (i) the broadcast programs whose recordings have been scheduled are rewritten against the user's will, and thus broadcast programs that the user has not intended to record are recorded instead; and (ii) so many recording tasks are scheduled that a Hard Disk Drive (HDD) will be filled, after the recordings, with the recorded broadcast programs.

The processing apparatus may further include an at-home time storage unit storing therein a user identifier and an expected at-home time of a corresponding one of the users, wherein the user information acquisition unit further acquires the user identifier of one or more of the users who are at home, based on the user identifier and the expected at-home time of the corresponding one of the users.

With the above structure, the processing apparatus can judge whether or not a user who can take an appropriate countermeasure is at home. This way the processing apparatus can carry out an appropriate countermeasure in correspondence with the users at home.

The processing apparatus may further include an identification unit operable to identify another processing apparatus that is logged in the processing apparatus and has access to resources stored in the processing apparatus, and to extract the user identifier of one of the users who is logged in the processing apparatus, wherein if the detection unit detects the virus, the countermeasure unit performs one of the virus-handling processes in correspondence with the extracted user identifier.

The above structure permits the processing apparatus to identify which one of the users is logged therein. This way the processing apparatus can carry out an appropriate countermeasure in correspondence with the user who is logged in the processing apparatus.

The processing apparatus may further include a reception unit operable to receive a user input, wherein the countermeasure unit determines and performs one of the virus-handling processes in correspondence with the received user input.

This structure enables the processing apparatus to identify a user based on an input received from the user. This way the processing apparatus can carry out an appropriate countermeasure in correspondence with the user who has made the user input.

BRIEF DESCRIPTION OF THE DRAWINGS

FIG. 4 is a table showing the structure and example contents of countermeasure information 1610.

FIG. 5 is a table showing the structure and example contents of message information 1620.

FIG. 6 is a table showing the structure and example contents of user level information 1630.

FIG. 7 is a table showing the structure and example contents of at-home user information 1640.

FIG. 8 is a table showing the structure and example contents of recording schedule information 1410.

FIG. 11 is a flowchart illustrating a process of "NAVIGATION 01", a right side of FIG. 11 illustrates screens that show messages and the like.

FIG. 12 is a flowchart illustrating a process of "NAVIGATION 02", a right side of FIG. 12 illustrates a screen that shows messages and the like.

FIG. 13 is a flowchart illustrating a process of "NAVIGATION 03", a right side of FIG. 13 illustrates a screen that shows messages and the like.

FIG. 19 is a table showing the structure and example contents of a connection status management table 8110.

DESCRIPTION OF CHARACTERS

10 BD-ROM
11 Memory Card
12 SD Card
20 Remote Control
30 Digital TV
40 and 8000 Routers
50 The Internet
60 Home Network
1000 and 2000 Recording Apparatuses
1100 Virus Detector
1200 Recording Apparatus Status Monitor
1300 User Manager
1400 and 2400 Recording Schedule Storages
1410 Recording Schedule Information
1500 and 2500 Broadcast Program Storages
1600 User Information Storage
1610 Countermeasure Information
1620 Message Information
1630 User Level Information
1640 At-home User Information
1650 Countermeasure Information Storage
1700 User Interface
1900 and 8700 Countermeasure Units
1910 Navigation Controller
1931 Message Output Unit
1932 E-mail Sender
1933 Fail-safe Recording Request Unit
1934 Recording Apparatus Initializing Unit
1935 Power Shutdown Unit
1936 and 8702 Network Blocking Units
1937 HDD Shutdown Unit
1938 Disc Ejector
1939 Password Setting Unit
3000 Personal Computer
4000 Mobile Telephone
5000, 5200 and 5300 Message Screens
5100 Password Entry Screen
5110 Password Entry Field
8110 Connection Status Management Table
8701 Information Backup Unit

DETAILED DESCRIPTION OF THE INVENTION

First Embodiment

Overview

A virus attacks and infects information processing apparatuses. As the processing apparatuses perform unique processes, types and degrees of damages caused by the virus vary depending on the type of processes.

Naturally, following the virus infection, different countermeasures are taken depending on types of the processes performed by the processing apparatuses. It is also a matter of course that there are different countermeasures that can be taken depending on a user's knowledge about the processing apparatuses.

A processing apparatus in general has a function of, when detecting a virus, taking countermeasures such as automatically eliminating the virus. In addition to which, the processing apparatus of the present invention has a function of executing various case-by-case countermeasures so as to deal with variations of the users and other factors.

For example, when the virus is detected in a recording/playback apparatus, it is required not only to eliminate the virus but also to check whether or not the recording schedule information and a time setting file are safely kept unaltered.

The present embodiment depicts the case where a recording/playback apparatus (hereafter recording apparatus) having a BD recorder is infected by the virus. This recording apparatus is connected to the Internet and a home network, and is used by a plurality of users at home.

<Structure>

Figure 1:
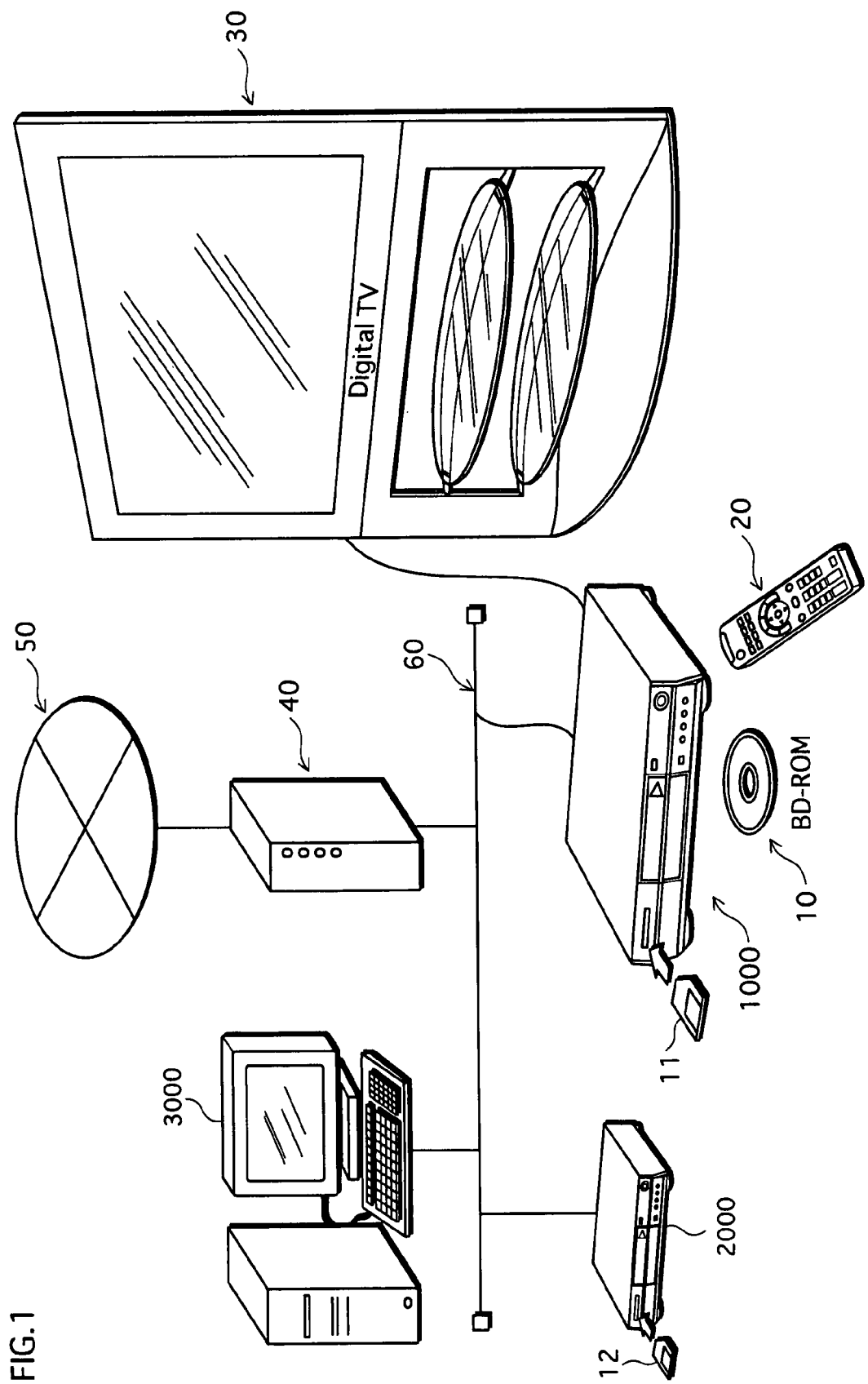
FIG. 1 is a diagram illustrating an example process being performed with use of a processing apparatus of the present invention.

FIG. 1 is a diagram illustrating an example process being performed with use of the processing apparatus of the present invention.

A digital TV 30, a personal computer 3000 and recording apparatuses 1000 and 2000 are connected to one another via a home network 60.

The home network 60 is connected, via a router 40, to the Internet 50.

Among the two recording apparatuses connected to the home network 60, the recording apparatus 1000 accepts a BD-ROM 10 and a Secure Digital memory card 11 (hereafter SD card), and is equipped with a remote control 20. Meanwhile, the recording apparatus 2000 accepts an SD card 12.

Figure 2:
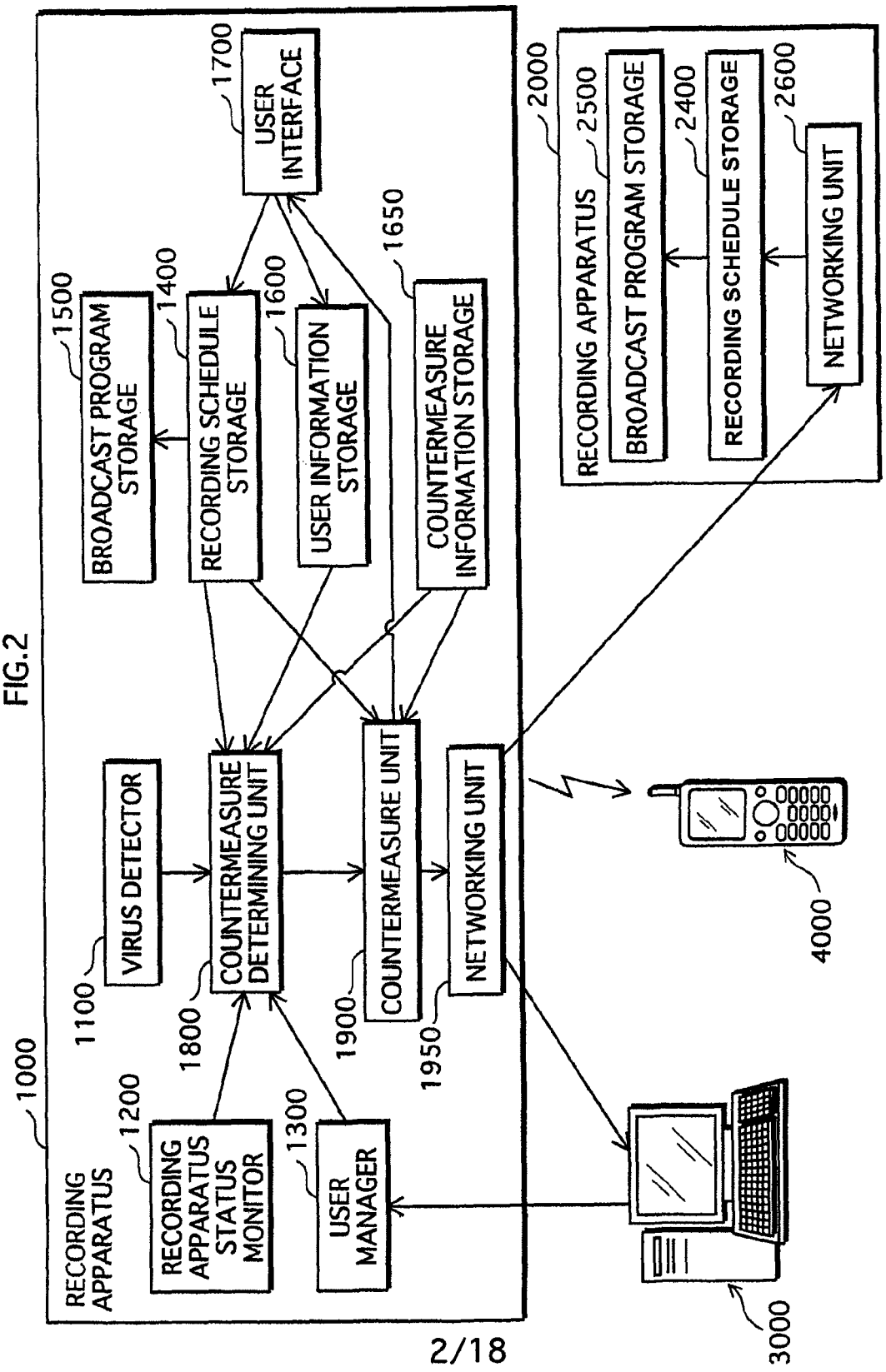
FIG. 2 is a functional block diagram illustrating the structures of recording apparatuses 1000 and 2000.

FIG. 2 is a functional block diagram illustrating the structures of the recording apparatuses 1000 and 2000.

The recording apparatus 1000 includes: a virus detector 1100; a recording apparatus status monitor 1200; a user manager 1300; a recording schedule storage 1400; a broadcast program storage 1500; a user information storage 1600; a countermeasure information storage 1650; a user interface 1700; a countermeasure determining unit 1800; a countermeasure unit 1900; and a networking unit 1950.

Being resident in a system of the recording apparatus 1000, the virus detector 1100 can perform monitoring of the virus at a constant time interval. If the virus is detected, the virus detector 1100 can perform processes such as eliminating the virus, and inform the countermeasure determining unit 1800 of the virus detection.

The recording apparatus status monitor 1200 can monitor what kind of process the recording apparatus 1000 is performing (i.e., whether the recording apparatus 1000 is recording a TV program, playing back the BD, and so on). The recording apparatus status monitor 1200 informs the countermeasure determining unit 1800 of what kind of process the recording apparatus 1000 is performing, if instructed to do so by the countermeasure determining unit 1800.

The user manager 1300 can manage an apparatus that is logged in the recording apparatus 1000. More specifically, the user manager 1300 stores (i) an identifier of a processing apparatus that is logged in the recording apparatus 1000 and thus can use resources of the recording apparatus 1000 and (ii) an identifier of a user who is logged from the processing apparatus in the recording apparatus 1000. For example, if the personal computer 3000 is logged in the recording apparatus 1000, the user manager 1300 stores the identifier of the computer 3000 (hereafter logged-in terminal identifier), the identifier of a user of the computer 3000, etc.

The recording schedule storage 1400 can store therein recording schedule information. To be specific, this recording schedule information indicates a name of a broadcast program that users want to record, a broadcast channel, a broadcast time, and so on.

The broadcast program storage 1500 can store therein data of, for example, a broadcast program that has been recorded. As a rule, the broadcast program whose recording schedule is stored in the recording schedule storage 1400 will be stored, after the actual recording, in the broadcast program storage 1500.

The user information storage 1600 can store therein information pieces, each being information regarding a different one of a plurality of users of the recording apparatus 1000, namely a different one of a plurality of family members.

The countermeasure information storage 1650 can store therein information showing different types of countermeasures to be taken if the recording apparatus 1000 is infected by the virus.

Further explanations regarding contents to be stored in the recording schedule storage 1400, the user information storage 1600, and the countermeasure information storage 1650 will be given in the <Data> section set forth below, with reference to FIGS. 4 through 8.

The user interface 1700 includes a control panel of the recording apparatus 1000, the remote control 20, an indicator, etc. The user interface 1700 can exchange information with the users by providing information to the users, receiving instructions from the users, and so on.

The countermeasure determining unit 1800 can, if the virus detection is informed thereto by the virus detector 1100, submit an inquiry to the recording apparatus status monitor 1200 and the like. Based on a response to the inquiry and on various information stored in the countermeasure information storage 1650 and the like, the countermeasure determining unit 1800 can also determine a specific countermeasure to be performed. Once having determined the specific countermeasure, the countermeasure determining unit 1800 requests the countermeasure unit 1900 to perform that specific countermeasure.

The countermeasure unit 1900 can perform various countermeasures as requested by the countermeasure determining unit 1800. One example of such countermeasures is to send an E-mail to a mobile telephone 4000 of a family member, the E-mail including information indicating the virus infection and the countermeasure to be performed. Further explanation regarding the countermeasure unit 1900 will be given below with reference to FIG. 3.

The networking unit 1950 can establish a connection with the home network 60 and exchange data with other apparatuses. More specifically, in receiving data, the networking unit 1950 picks up packets addressed thereto from among all packets carried by the home network 60. In order to transmit data, the networking unit 1950 first assigns an address of a transmission destination to an addressee field of each of packets, and then transmits the packets via the home network 60.

Furthermore, the networking unit 1950 can also cut off the connection with the home network 60 when instructed to do so by a network blocking unit 1936, which is described in detail below. The networking unit 1950 reestablishes the network connection upon receiving, via the user interface 1700 and the like, an instruction to do so from a user.

The recording apparatus 2000 includes the recording schedule storage 2400, the broadcast program storage 2500 and the networking unit 2600.

The broadcast program storage 2500 has the same function as the broadcast program storage 1500 of the recording apparatus 1000. Likewise, the networking unit 2600 has the same function as the networking unit 1950 of the recording apparatus 1000.

The recording schedule storage 2400 has the same function as the recording schedule storage 1400 of the recording apparatus 1000, except that the information stored in the recording schedule storage 1400 is set, via the user interface 1700, by the users, whereas the information stored in the recording schedule storage 2400 is set not only by the users but also by the recording apparatus 1000.

That is, in the recording apparatus 1000, the countermeasure unit 1900 transfers the recording schedule information stored in the recording schedule storage 1400 via the networking unit 1950 to the recording apparatus 2000. Accordingly, the recording apparatus 2000 receives the recording schedule information via the networking unit 2600. Following the reception, in the recording apparatus 2000, a fail-safe recording request unit 1933 stores the recording schedule information into the recording schedule storage 2400.

Described hereinbefore are functional features of the recording apparatuses 1000 and 2000. Besides these features, the recording apparatuses 1000 and 2000 also have functions a general recording/playback apparatus has, such as recording, playback and copying functions. These functions of the general recording/playback apparatus are not illustrated in the drawings.

Figure 3:
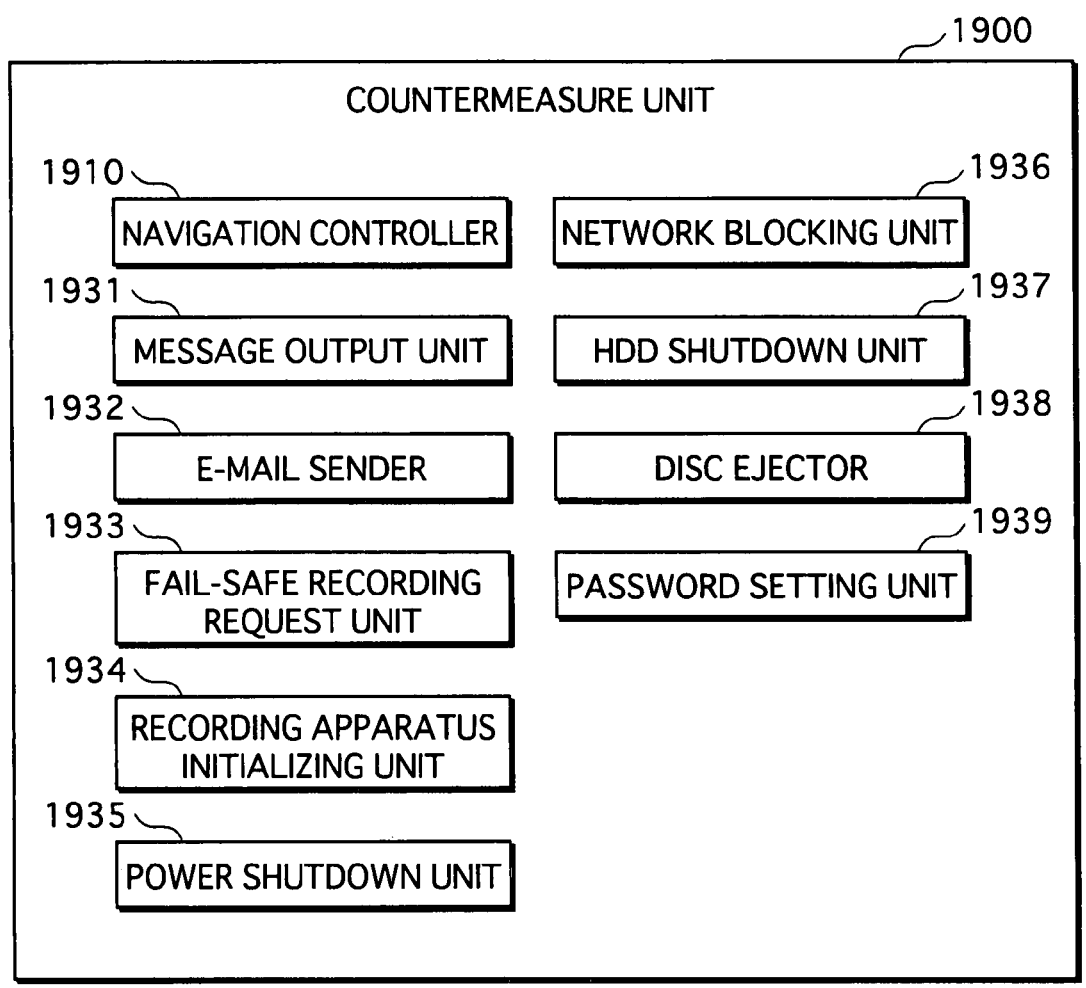
FIG. 3 is a functional block diagram illustrating the structure of a countermeasure unit 1900.

FIG. 3 is a functional block diagram illustrating the structure of a countermeasure unit 1900.

The countermeasure unit 1900 includes: a navigation controller 1910; a message output unit 1931; an E-mail sender 1932; the fail-safe recording request unit 1933; a recording apparatus initializing unit 1934; a power shutdown unit 1935; the network blocking unit 1936; an HDD shutdown unit 1937; a disc ejector 1938; and a password setting unit 1939.

The navigation controller 1910 can navigate the users by displaying a countermeasure against the virus that should be taken by the users.

The message output unit 1931 can output a designated message to a designated processing apparatus. In the case where the designated message is going to be displayed on another apparatus other than the recording apparatus 1000, the message output unit 1931 sends the designated message to the another apparatus via the networking unit 1950.

The E-mail sender 1932 can send the designated message as an E-mail to a designated user's mobile telephone 4000 and email address.

The fail-safe recording request unit 1933 can request a designated recording apparatus to record a designated broadcast program.

The recording apparatus initializing unit 1934 can initialize the recording apparatus 1000.

The power shutdown unit 1935 can shut down the power of the recording apparatus 1000.

The network blocking unit 1936 can disconnect the recording apparatus 1000 from the home network 60, if instructed to do so. While the network is disconnected, the networking unit 1950 never picks up packets carried by the home network 60.

The HDD shutdown unit 1937 can disable the recording apparatus 1000 from accessing the HDD.

The disc ejector 1938 can eject the BD-ROM 10.

The password setting unit 1989 has functions of setting a password and requesting a user to enter the password when a designated process is activated.

The recording apparatus 1000 can achieve its functions with its CPU executing programs stored in a memory or a hard disc of the recording apparatus 1000. Similarly, the recording apparatus 2000 can achieve its functions with its CPU executing programs stored in a memory or a hard disc of the recording apparatus 2000.

<Data>

The following describes major data used in the processing apparatus of the present invention with reference to FIGS. 4 through 8.

FIG. 4 is a table showing the structure and example contents of countermeasure information 1610.

The countermeasure information 1610 is stored in the countermeasure information storage 1650.

The countermeasure information 1610 includes an apparatus status 1611, a user level 1612 and a countermeasure procedure 1613.

The apparatus status 1611 indicates an operation status of the recording apparatus 1000, namely what process the recording apparatus 1000 is currently performing (e.g., the recording apparatus 1000 has accepted a recording schedule, is currently recording, playing back the BD, etc.).

The apparatus status 1611 tells what operation the recording apparatus 1000 is performing at the time of the virus detection. The apparatus status 1611 is monitored by the recording apparatus status monitor 1200.

The user level 1612 indicates how well each user of the recording apparatus 1000 knows about the processing apparatus and the virus. More specifically, as shown in the middle column of FIG. 4, "HIGH", "MIDDLE" and "LOW" mean the user's knowledge about the processing apparatus and the virus is advanced, intermediate and poor, respectively.

The countermeasure procedure 1613 shows a procedure for carrying out the countermeasure when the virus is detected. For example, when the apparatus status 1611 is "RECORDING SCHEDULED" and the user level 1612 is "HIGH", the countermeasure procedure to be taken is to "ACTIVATE NAVIGATION 01".

In the present embodiment, as shown in FIG. 4, the procedure for taking the countermeasure when the virus is detected in the recording apparatus 1000 is different depending on the status of the recording apparatus 1000 and the user's knowledge about the processing apparatus and the virus.

FIG. 5 is a table showing the structure and example contents of message information 1620.

The message information 1620 is a list of messages to be displayed on the recording apparatus 1000, and is stored in the countermeasure information storage 1650.

The message information 1620 includes a message number 1621 and a message 1622.

The message number 1621 is a number that identifies a message to be displayed. The message is displayed by designating the message number 1621.

The message 1622 is a message to be displayed on the recording apparatus 1000. The message 1622 corresponds one-to-one to the message number 1621.

The message output unit 1931 outputs the message by reference to the message information 1620. For example, when the message number "11" is designated, the message output unit 1931 will output a message corresponding to that number, i.e., "VIRUS IS DETECTED. PLEASE CHECK IF ALL SETTINGS ARE KEPT UNALTERED."

FIG. 6 is a table showing the structure and example contents of user level information 1630.

The user level information 1630 is stored in the user information storage 1600 and shows each family member's knowledge about the recording apparatus 1000. The user level information 1630 is input by users via the user interface 1700.

The user level information 1630 includes a user identifier 1631, a user level 1632 and a user E-mail address 1633.

The user identifier 1631 is a character string and the like that is assigned one-to-one to each one of the family members. In other words, each one of the family members has one user identifier. The user level 1632 shows how well each user knows about the recording apparatus 1000 and the like.

The user E-mail address 1633 is an E-mail address of each one of the users who are assigned with the corresponding user identifiers 1631. Namely, the user E-mail address 1633 is contact information in the case of virus detection.

For example, a user assigned with "User 01" as the user identifier 1631 has a "HIGH" level of knowledge about the recording apparatus 1000 and the like. The user E-mail address 1633, or the contact information of the "User 01" is "User01@xxx.or.jp".

FIG. 7 is a table showing the structure and example contents of at-home user information 1640.

The at-home user information 1640 as well as the user level information 1630 is stored in the user information storage 1600. The at-home user information 1640 tells when each one of the family members is at home. The at-home user information 1640 is input by users via the user interface 1700. Note that FIG. 7 shows example contents of the at-home user information 1640, wherein the contents of the at-home user information 1640 may change daily, monthly, etc.

The at-home user information 1640 includes an at-home time 1641 and an at-home user 1642.

The at-home time 1641 shows a time period within which a user is staying at home.

The at-home user 1642 shows the user identifiers of users who are staying at home within the corresponding at-home time 1641.

For example, during the at-home time 1641 of "0:00-7:00", three users, namely "User 01", "User 02" and "User 03" are staying at home.

FIG. 8 is a table showing the structure and example contents of recording schedule information 1410.

The recording schedule information 1410 is stored in the recording schedule storage 1400, and contains information regarding broadcast programs and the like that have been scheduled for recording on the recording apparatus 1000. The recording schedule information 1410 is input via the user interface 1700 by users.

The recording schedule information 1400 includes a date 1411, a recording time 1412, a channel 1413, and a program name 1414.

The date 1411 is a date on which a broadcast program that has been scheduled for recording is broadcast.

The recording time 1412 is a time during which the broadcast program to be recorded unattended will be broadcast. In other words, the recording time 1412 is a time during which the recording apparatus 1000 performs recording.

The channel 1413 is a channel on which the broadcast program that has been scheduled for recording is broadcast. The program name 1414 shows a name of the broadcast program that has been scheduled for recording.

For example, if the date 1411, the recording time 1412, the channel 1413 and the program name 1414 show, respectively, "February 13", "10:30-11:00", "10" and "TODAY'S COOKING", it means the recording apparatus 1000 has accepted a recording schedule for a program named "TODAY'S COOKING" that will be broadcast on February 13 on channel 10 from 10:30 to 11:00.

<Operation>

Described below is an operation of the recording apparatus 1000 of the present invention, with reference to FIGS. 9 through 15.

Figure 9:
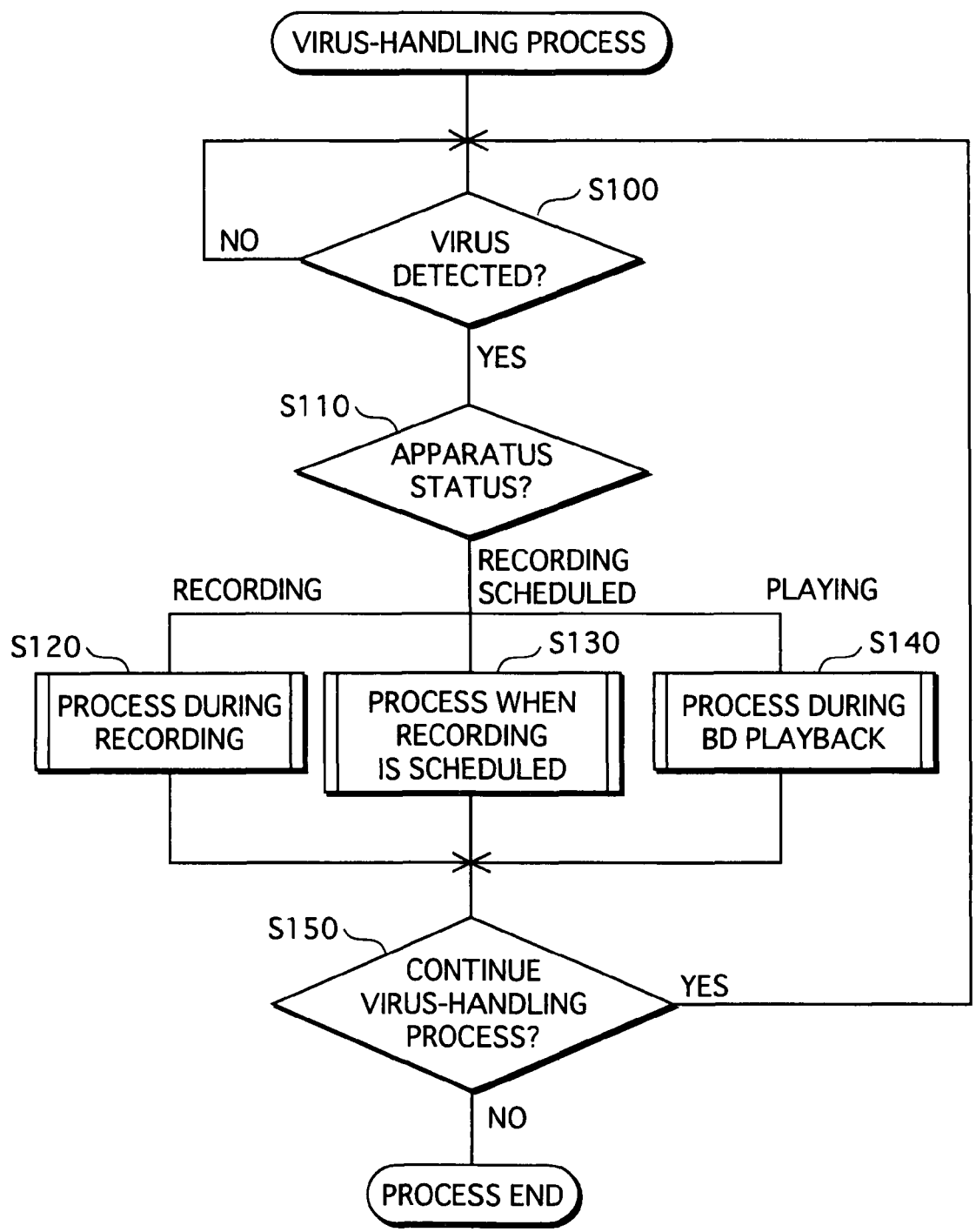
FIG. 9 is a flowchart illustrating virus-handling processes of the recording apparatus 1000.

FIG. 9 is a flowchart illustrating virus-handling processes of the recording apparatus 1000.

In the recording apparatus 1000, the virus detector 1100 performs monitoring of the virus at a constant time interval (Step S100).

Upon detecting the virus (the YES branch of Step S100), the virus detector 1100 first performs such processes as eliminating the virus, and then informs the countermeasure determining unit 1800 that the virus is detected.

Upon receiving the information of the virus detection, the countermeasure determining unit 1800 requests the network blocking unit 1936 of the countermeasure unit 1900 to disconnect the recording apparatus 1000 from an outside network.

The countermeasure determining unit 1800 submits an inquiry to the recording apparatus status monitor 1200 about what status the recording apparatus is in (Step S110).

Upon receiving the inquiry, the recording apparatus status monitor 1200 informs the countermeasure determining unit 1800 of the status of the recording apparatus.

To be specific, the status of the recording apparatus is one of the statuses shown by the apparatus status 1611 in the countermeasure information 1610. When the recording schedule information 1410 (stored in the recording schedule storage 1400) contains information of a broadcast program that will be recorded unattended following that moment, the recording apparatus status monitor 1200 judges the status to be "RECORDING SCHEDULED". Likewise, the recording apparatus status monitor 1200 judges the status to be "RECORDING" when a recording function of the recording apparatus 1000 is running, and to be "PLAYING BD" when the BD is being played back.

As seen in the above explanation, there are three types of apparatus statuses in the present embodiment. However, there may be other types of apparatus statuses. In the case of detecting a plurality of apparatus statuses at the same time, it is permissible to set priorities to perform processes depending on these apparatus statuses, or to perform processes according to one of these apparatus statuses. The present embodiment assumes that more than one type of apparatus statuses never occurs concurrently, for the sake of simple explanation.

Upon receiving the apparatus status from the recording apparatus status monitor 1200, the countermeasure determining unit 1800 carries out a process in correspondence with the received apparatus status (Steps S120, S130 and S140).

After the process is completed, the countermeasure determining unit 1800 decides whether or not to continue the virus handling process of the recording apparatus 1000 (i.e., whether or not to restart the monitoring of the virus) (Step S150).

If the countermeasure determining unit 1800 has decided to continue the virus handling process (the YES branch of Step S150), the networking unit 1950 performs a process to reestablish connection with the outside network. The countermeasure determining unit 1800 then restarts the virus handling process by requesting the virus detector 1100 to start the monitoring of the virus (Step S100).

On the other hand, if the countermeasure determining unit has decided not to continue the virus handling process (the NO branch of Step S150), the virus handling process is terminated.

As a rule, the countermeasure determining unit 1800 always decides to continue the virus handling process (except a few occasions which will be explained below). This is because the recording apparatus 1000 is considered to be back in its normal state after going through all the steps of the virus handling process.

There are a few occasions where the countermeasure determining unit 1800 decides not to continue the virus handling process: when carrying out a countermeasure to shut off the power of the recording apparatus 1000, when a countermeasure is completed in an abnormal manner, and so on. When the countermeasure is completed in an abnormal manner, the networking unit 1950 does not establish the connection with the outside network, because doing so in such a situation is considered to be unsafe. Here, there is thus no need for conducting the virus handling process.

The following describes processes to be performed (i) when recording is being scheduled (Step S130), (ii) during recording (Step S120), and (ii) during BD playback (Step S140).

<1. Process when Recording is Scheduled>

Figure 10:
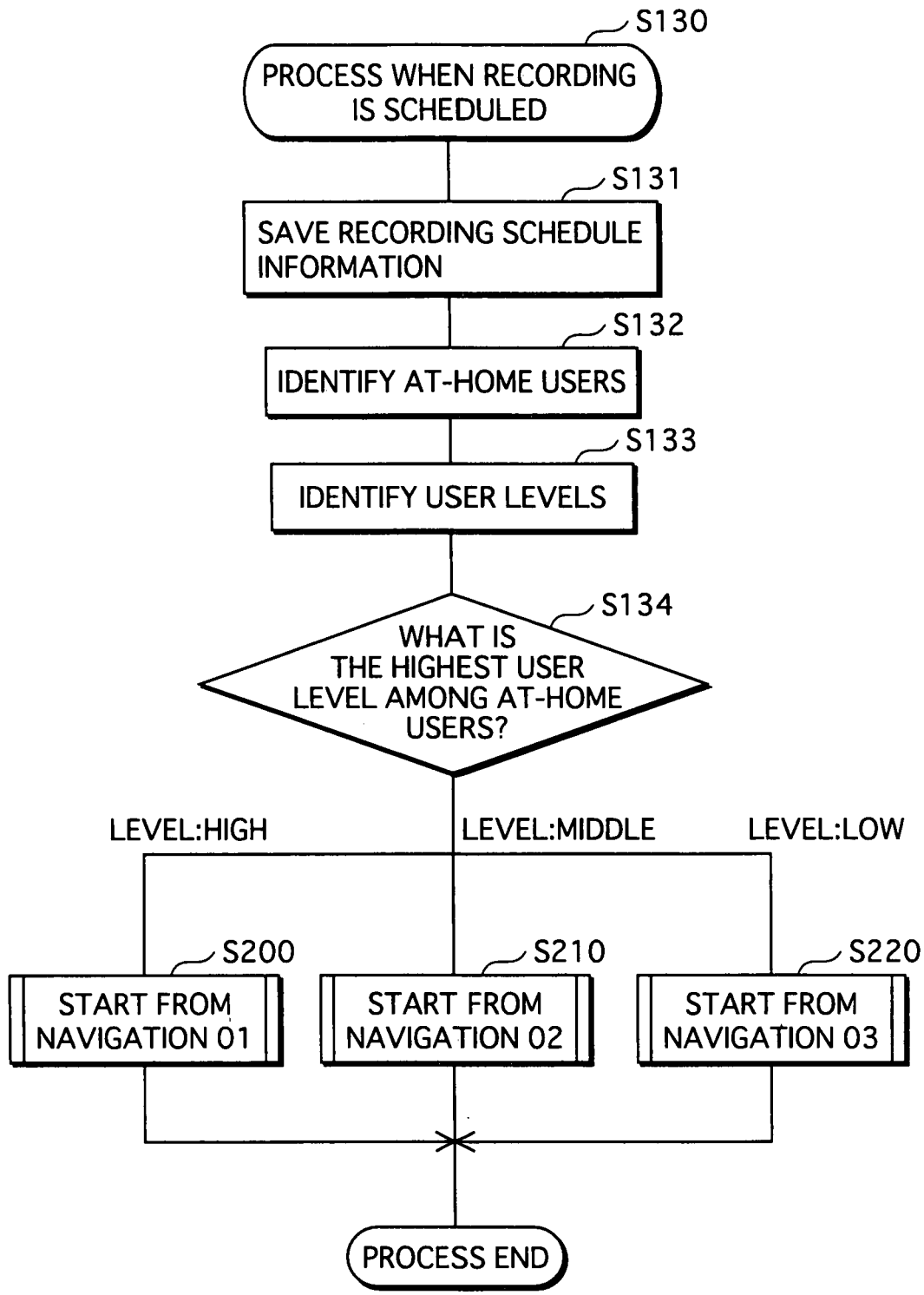
FIG. 10 is a flowchart illustrating a process that is performed when a recording is being scheduled.

In this section, the process to be performed when recording is scheduled is explained with use of FIG. 10. FIG. 10 is a flowchart illustrating a process that is performed when recording is scheduled.

Assume that the virus detector 1100 detects the virus on February 13 at 17:00.

First, upon being informed by the recording apparatus status monitor 1200 that the apparatus status is "RECORDING SCHEDULED", the countermeasure determining unit 1800 performs a process to save the recording schedule information 1410 (Step S131). Specifics of this process is discussed later in <1. I. Process to Save Recording Schedule Information>.

Next, the countermeasure determining unit 1800 retrieves the at-home user information 1640 (stored in the user information storage 1600) and identifies users who are currently at home (Step S132).

With the current time being 17:00, the countermeasure determining unit 1800 acknowledges that the current time falls into "16:00-21:00" of the at-home time 1641, and thereby that two users, namely "User 02" and "User 03", are currently at home.

Next, the countermeasure determining unit 1800 retrieves the user level information 1630 (stored in the user information storage 1600) and finds out the levels of the users who are currently at home (Step S133).

With the at-home users being "User 02" and "User 03", the countermeasure determining unit 1800 acknowledges the user identifier 1631 of each of these at-home users, and their corresponding levels 1632 to be "MIDDLE" and "LOW".

Once the user levels of the at-home users are found, the countermeasure determining unit 1800 confirms which one of the at-home users has the highest user level (Step S134). The countermeasure determining unit 1800 then stores the highest user level and its corresponding user identifier in a memory.

After confirming the highest user level, the countermeasure determining unit 1800 retrieves the countermeasure information 1610 (stored in the countermeasure information storage 1650) and determines a countermeasure procedure 1613 to be carried on.

To be specific, in the above case, the informed apparatus status 1611 is "RECORDING SCHEDULED" and the current highest user level 1612 is "MIDDLE". Thus the countermeasure determining unit 1800 determines the countermeasure procedure to be "ACTIVATE NAVIGATION 02".

The countermeasure determining unit 1800 also requests that the user manager 1300 provide thereto (i) the current logged-in terminal identifier and (ii) the user identifier of the user who is currently logged in.

Following the aforementioned request, the user manager 1300 identifies a personal computer or the like that is logged in, and provides the countermeasure determining unit 1800 with (i) the logged-in terminal identifier of the computer and (ii) the user identifier of the user who is logged in.

Upon receiving these identifiers (i.e., the logged-in terminal identifier and the user identifier), the countermeasure determining unit 1800 checks whether or not the received user identifier is of the user whose user level 1612 is currently the highest. If so, the countermeasure determining unit 1800 outputs a message (i.e., navigation) and the like to the personal computer in which the user is logged.

If the received user identifier is not of the user whose user level 1612 is currently the highest, the countermeasure determining unit 1800 shows the message on displays of all the personal computers and home electrical appliances.

For example, if "User 02" has the highest user level 1632 among all the at-home users, and if "User 02" is logged in the recording apparatus 1000, the countermeasure determining unit 1800 outputs the message to the personal computer in which "User 02" is logged. If "User 02" is not logged in, the countermeasure determining unit 1800 shows the message on the displays of all the home electrical appliances that are connected to the home network.

Once having determined the countermeasure procedure 1613 to be carried out, the countermeasure determining unit 1800 issues instructions to the countermeasure unit 1900 to save the recording schedule information 1410, and to activate "NAVIGATION 02". In the case of displaying the message (i.e., navigation) and the like on a specific personal computer, the countermeasure determining unit 1800 provides the countermeasure unit 1900 with the logged-in terminal identifier of the specific personal computer, concurrently with the issuing of the aforementioned instructions.

Once having received the instruction to activate "NAVIGATION 02", the countermeasure unit 1900 requests the navigation controller 1910 to execute "NAVIGATION 02" (see FIG. 2). As requested, the navigation controller 1910 executes "NAVIGATION 02" (Step S210).

Figure 11:
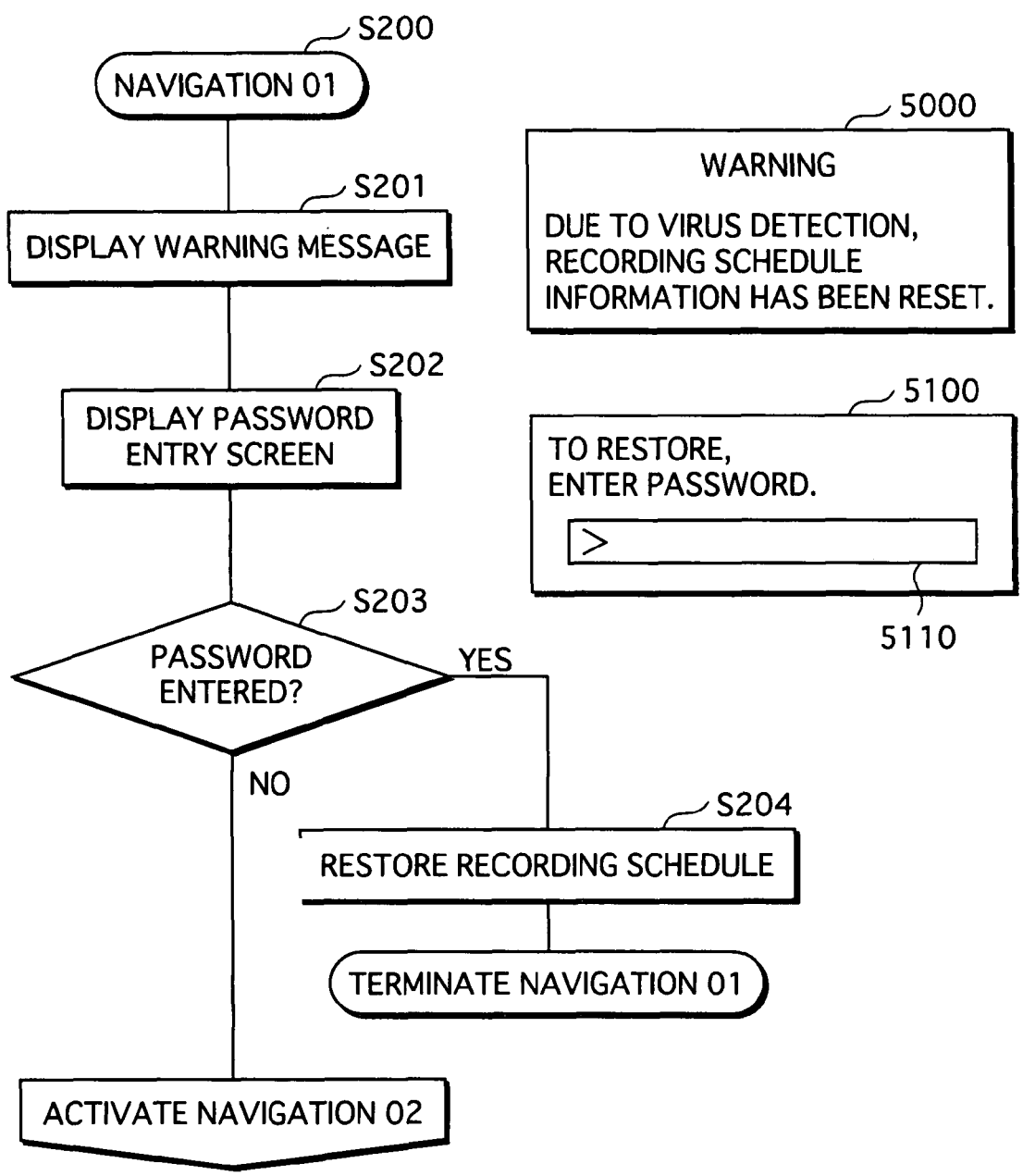
Figure 12:
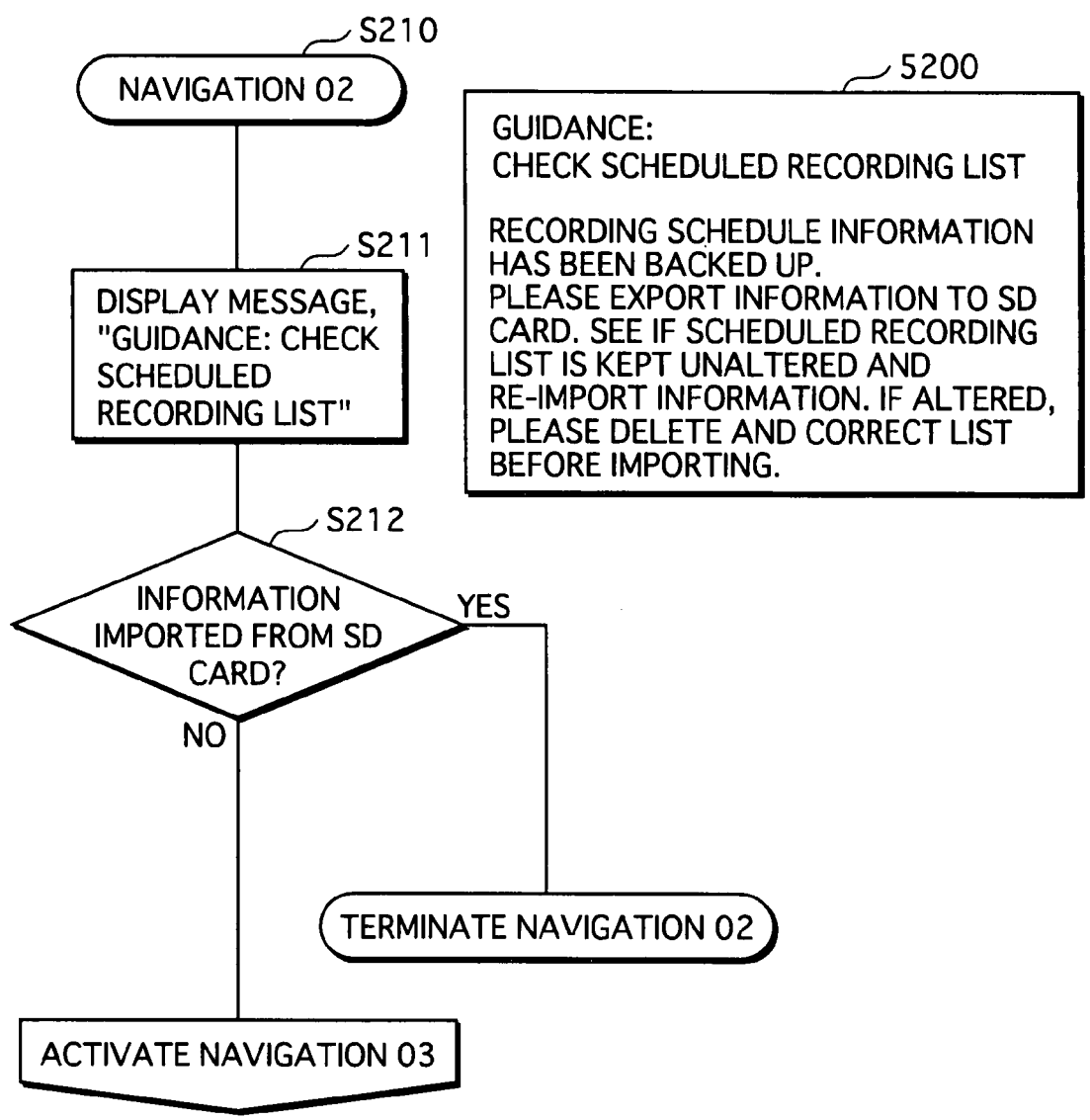
Figure 13:
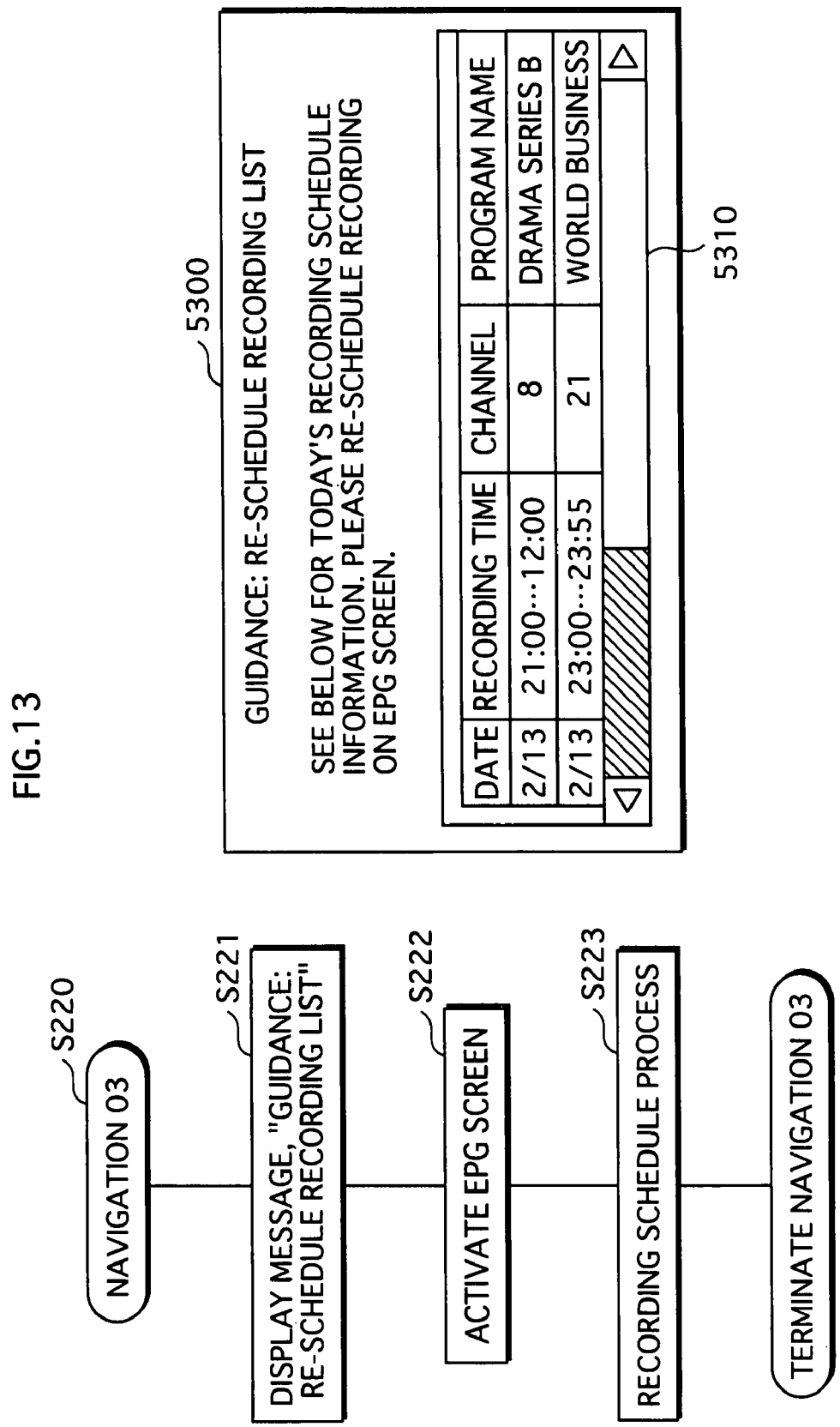

The following are descriptions of "NAVIGATION 01", "NAVIGATION 02" and "NAVIGATION 03" with reference to FIGS. 11 through 13.

"NAVIGATION 01", "NAVIGATION 02" and "NAVIGATION 03" are parts of the countermeasure procedure 1630 of the present embodiment. In the present embodiment, "NAVIGATION 02" diverges from "NAVIGATION 01" and "NAVIGATION 03" diverges from "NAVIGATION 02". It should be noted that "NAVIGATION 02" and "NAVIGATION 03" can be a starting point of the countermeasure procedure 1630.

Assume, for example, that "NAVIGATION 01" is activated for guiding a user through execution of the countermeasure (Step S200). Note that "NAVIGATION 01" is targeted at the at-home user whose user level 1612 is "HIGH". Here, if the user does not input anything for a given period of time regardless of an input request from "NAVIGATION 01", or if data that has been input by the user is inappropriate, the countermeasure unit 1900 activates "NAVIGATION 02".

Likewise, if a user does not input anything for the given period of time regardless of an input request from "NAVIGA- TION 02", or if data that has been input by the user is inappropriate, the countermeasure unit 1900 activates "NAVIGATION 03".

Described below is the process to save the recording schedule information 1410, followed by explanations of "NAVIGATION 01", "NAVIGATION 02" and "NAVIGATION 03".

<1. I. Process to Save Recording Schedule Information>

After the recording apparatus status monitor 1200 informs the countermeasure determining unit 1800 that the apparatus status is "RECORDING SCHEDULED", the countermeasure determining unit 1800 instructs the fail-safe recording request unit 1933 to request another apparatus to record a broadcast program that has been scheduled for recording.

Following the instruction, the fail-safe recording request unit 1933 retrieves the recording schedule information 1410 (see FIG. 8) stored in the recording schedule storage 1400, sends the retrieved recording schedule information 1410 to the recording apparatus 2000 (see FIG. 2), and requests the recording apparatus 2000 to perform the recording.

The recording apparatus 2000 stores the recording schedule information 1410 in the recording schedule storage 2400. Once the recording schedule information 1410 is stored, the recording apparatus 2000 records a broadcast program according to the recording schedule, and stores the recorded broadcast program in the broadcast program storage 2500.

Also, once the recording schedule information 1410 is stored, the recording apparatus 2000 notifies the fail-safe recording request unit 1933 that the recording schedule information 1410 has being successfully stored. Upon receiving this notification, the fail-safe recording request unit 1933 deletes the recording schedule information 1410 stored in the recording schedule storage 1400.

Here, it is regarded that the user pre-registers the recording apparatus 2000 on the recording apparatus 1000, so that the fail-safe recording request unit 1933 can request the recording apparatus 2000 to perform the recording. Otherwise, it is permissible to give a time-recognizable function to the fail-safe recording request unit 1933, so that the fail-safe recording request unit 1933 can recognize the time during which the scheduled recording is performed, and identify a recording apparatus that performs no scheduled recordings or is not infected by the virus during the time.

Described below is the process of "NAVIGATION 01" (Step S200) with reference to FIG. 11. FIG. 11 is a flowchart illustrating the process of "NAVIGATION 01". A right side of the flowchart illustrates screens that show messages and the like.

The description below is based on the following assumptions: the virus detector 1100 detects the virus on February 13 at 6:00; the countermeasure determining unit 1800 determines the countermeasure procedure 1613 to be "NAVIGATION 01"; and the user whose user level 1612 is "HIGH" is not logged in the personal computer 3000.

Once the countermeasure procedure 1613 is determined, the countermeasure determining unit 1800 notifies the countermeasure unit 1900 that (i) the messages and the like will be output to all apparatuses and (ii) "NAVIGATION 01" is going to be activated.

Upon receiving the aforementioned notification, the countermeasure unit 1900 requests the navigation controller 1910 to execute "NAVIGATION 01" (see FIG. 2).

Accordingly, the navigation controller 1910 requests the message output unit 1931 to display a warning message, and at the same time, designates the message number 1621 corresponding to the message 1622 to be displayed (see FIG. 5).

Following the request, the message output unit 1931 retrieves the message information 1620 stored in the countermeasure information storage 1650. The message output unit 1931 then displays the message 1622 that corresponds to the designated message number 1621 on all the apparatuses that are connected to the home network 60 (Step S201, a message screen 5000).

After requesting the message output unit 1931 to display the message, the navigation controller 1910 instructs the password setting unit 1939 to configure the settings for password-related operations.

As instructed, the password setting unit 1939 displays the password entry screen 5100 (Step S202), then requests the user interface 1700 and the like not to accept any password entries except those made from a keyboard to the password entry field 5110.

It is regarded that the password is pre-registered by the user.

If the correct password is input to the password entry field 5110 (the YES branch of Step S203), the password setting unit 1939 recognizes that the correct password entry has been made, and requests the user interface 1700 and the like to accept various inputs.

Once having being informed that the correct password is input, the navigation controller 1910 leaves execution of the countermeasure to the user from then on. This is because the user who knows the correct password is judged to know the proper countermeasure to be performed.

Following the above event, the recording apparatus 1000 performs a process to restore recording schedule in accordance with the user's instruction (Step S204).

For example, in accordance with the user's instruction, the recording apparatus 1000 requests, by means of the user interface 1700 and the like, the recording apparatus initializing unit 1934 to initialize the recording apparatus 1000. Then the user checks whether the recording schedule information 1410, which is stored in the recording schedule storage 2400 of the recording apparatus 2000, is correct. If the recording schedule information 1410 is correct, the user transfers the recording schedule information 1410 to the recording schedule storage 1400 of the recording apparatus 1000.

In order to notify the recording apparatus 1000 that the process to restore the recording schedule is completed, the user, for instance, selects a certain menu item. Accordingly, the recording apparatus 1000 informs the navigation controller 1910 of the completion of the restoring process. The navigation controller 1910 then terminates the process of "NAVIGATION 01".

When the password entry screen 5100 is displayed, if there is no password entry for a given period of time, or if the wrong password is input a given number of times (the NO branch of Step S203), the navigation controller 1910 terminates the process of "NAVIGATION 01" and performs the process of "NAVIGATION 02".

<1. III. NAVIGATION 02>

Described below is the process of "NAVIGATION 02" (Step S210) with reference to FIG. 12. FIG. 12 is a flowchart illustrating the process of "NAVIGATION 02". The right side of FIG. 12 illustrates a screen that shows messages and the like.

The process of "NAVIGATION 02" is performed in the following two cases.

One is the case where the process of "NAVIGATION 02" is performed following the process of "NAVIGATION 01". The other is the case where the countermeasure determining unit 1800 determines to activate "NAVIGATION 02" as the countermeasure procedure 1613.

In the latter case, the countermeasure determining unit 1800 requests the countermeasure unit 1900 to perform the process of "NAVIGATION 02".

The following explanation of the process of "NAVIGATION 02" is given under the assumption that the process of "NAVIGATION 02" soon follows the process of "NAVIGATION 01", which is described in <1. II. NAVIGATION 01>.

As with the process of "NAVIGATION 01", the process of "NAVIGATION 02" is controlled by the navigation controller 1910.

Once having judged that the process of "NAVIGATION 02" should be performed (see FIG. 11), the navigation controller 1910 requests the message output unit 1931 to display "Guidance: Check Scheduled Recording List", which is a message encouraging the users to check the contents of the recording schedule information (Step S211, a message screen 5200).

Following the above request, if the navigation controller 1910 confirms that the user has inserted the SD card into the slot and created the recording schedule information 1410 in the recording schedule storage 1400 (the YES branch of Step S212), the process of "NAVIGATION 02" is terminated.

This is because once the SD card is inserted and the recording schedule information 1410 is created, the navigation controller 1910 judges that the recording schedule information 1410 has been restored.

The process of "NAVIGATION 02" is also terminated when the user instructs the navigation controller 1910 to terminate "NAVIGATION 02".

If the user does not insert the SD card into the slot for a given period of time (the NO branch of Step S212), the navigation controller 1910 judges that the recording schedule information 1410 has not been restored, and thereby proceeds to perform the process of "NAVIGATION 03".

The following describes specific tasks that a user performs to create the recording schedule information 1410 in the recording schedule storage 1400 by inserting the SD card into the slot (see Step S212).

The user who has seen the message "Guidance: Check Scheduled Recording List" (see the message screen 5200) performs the following process.

First, the user checks whether or not the recording schedule information 1410 (stored in the recording schedule storage 2400 of the recording apparatus 2000) has been falsified, and accordingly saves the recording schedule information 1410 on the SD card.

Next, the user inserts the SD card with the recording schedule information 1410 stored thereon into the slot in the recording apparatus 1000, and saves the recording schedule information 1410 stored on the SD card into the recording schedule storage 1400 ("NAVIGATION 02" is terminated at this point).

The user then deletes the recording schedule information 1410 left in the recording apparatus 2000.

<1. IV. NAVIGATION 03>

Described below is the process of "NAVIGATION 03" (Step S220) with reference to FIG. 13. FIG. 13 is a flowchart illustrating the process of "NAVIGATION 03". The right side of FIG. 13 illustrates a screen that shows messages and the like.

The process of "NAVIGATION 03" is performed in the following two cases.

One is the case where the process of "NAVIGATION 03" is performed following the process of "NAVIGATION 02". The other is the case where the countermeasure determining unit 1800 determines to activate "NAVIGATION 03" as the countermeasure procedure 1613.

In the latter case, the countermeasure determining unit 1800 requests the countermeasure unit 1900 to perform the process of "NAVIGATION 03".

The following explanation of the process of "NAVIGATION 03" is given under the assumption that the process of "NAVIGATION 03" soon follows the process of "NAVIGATION 02", which is described in <1. III. NAVIGATION 02>.

As with the processes of "NAVIGATION 01" and "NAVIGATION 02", the process of "NAVIGATION 03" is controlled by the navigation controller 1910.

Once having judged that the process of "NAVIGATION 03" should be performed, the navigation controller 1910 (see FIG. 12) retrieves the recording schedule information 1410 that is stored in the recording schedule storage 2400 of the recording apparatus 2000.

The navigation controller 1910 then provides the retrieved recording schedule information 1410 to the message output unit 1931, and requests the message output unit 1931 to display (i) the recording schedule information 1410 and (ii) "Guidance: Re-Schedule Recording List", which is a message encouraging the user to re-schedule recording of a broadcast program.

As requested, the message output unit 1931 displays the recording schedule information and the message (Step S221, a message screen 5300 and a scheduled program list 5310).

Furthermore, the navigation controller 1910 displays an EPG (Electronic Program Guide) screen (Step S222) in preparing to accept a recording schedule based on EPG data. The navigation controller 1910 instructs the user interface 1700 to display the EPG screen and to accept the recording schedule.

The user re-schedules the recording of the broadcast program from the EPG screen, with reference to the scheduled program list 5310 that is shown together with "Guidance: Re-Schedule Recording List" on the message screen 5300 (Step S223).

Once having detected that the user has completed the re-scheduling of the recording, the navigation controller 1910 terminates the process of "NAVIGATION 03".

<2. Process During Recording>

Figure 14:
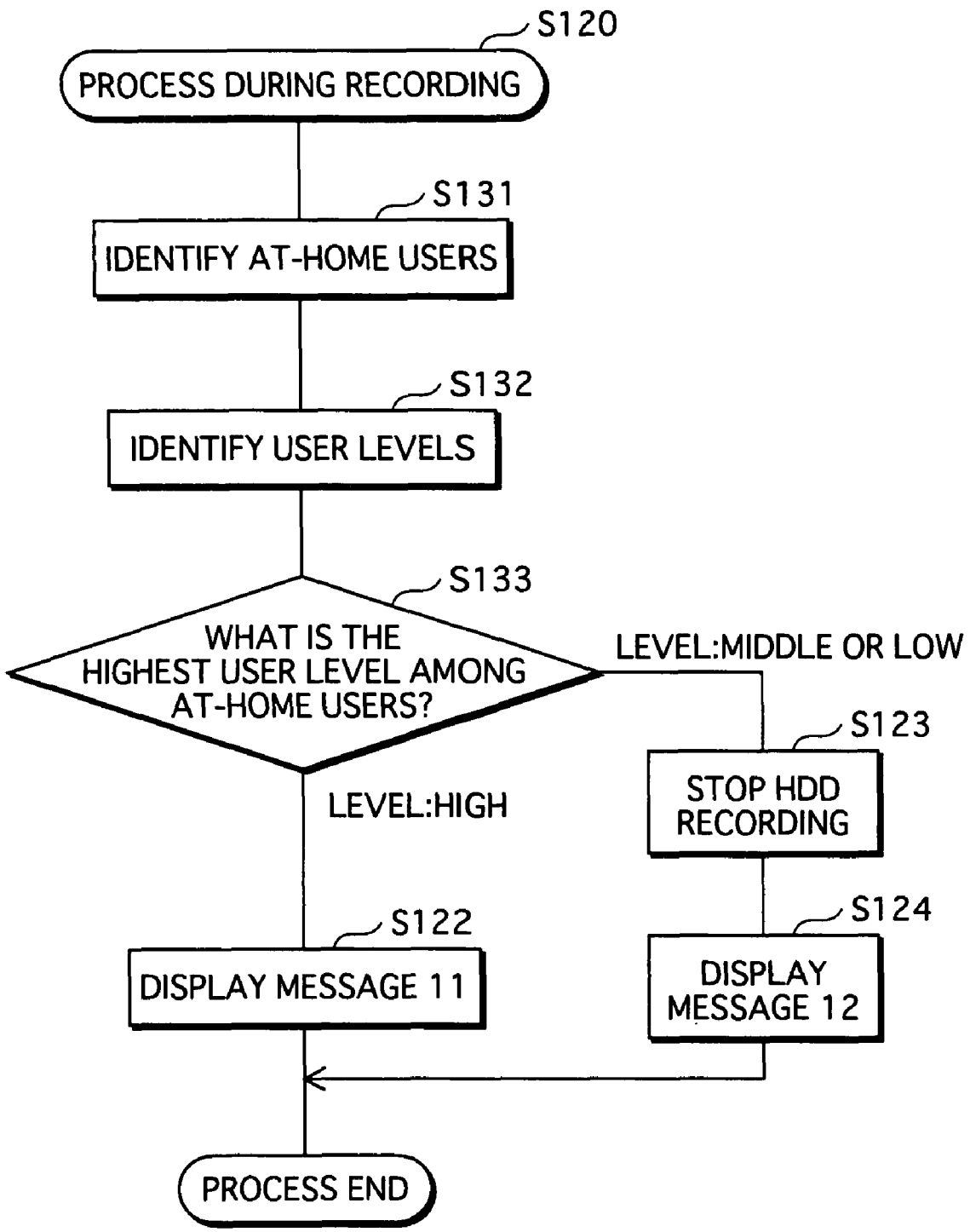
FIG. 14 is a flowchart illustrating a process that is performed while video is being recorded.

The process that is performed during recording is described hereafter with reference to FIG. 14. FIG. 14 is a flowchart illustrating the process that is performed while video is being recorded.

The description below is based on the following assumption: the virus detector 1100 detects the virus on February 13 at 17:00.

First, the recording apparatus status monitor 1200 informs the countermeasure determining unit 1800 that the apparatus status is "RECORDING". The countermeasure determining unit 1800 accordingly identifies (i) users who are currently at home (Step S131) and (ii) the user levels of the users who are at home (Step S132). The countermeasure determining unit 1800 then identifies the highest user level among these at-home users (Step S133).

The above Steps are the same as the Steps S131, S132 and S133 in FIG. 10.

With the current time being 17:00, the countermeasure determining unit 1800 acknowledges that (i) two users, namely "User 02" and "User 03" are currently at home, (ii) the user levels 1632 corresponding to the user identifiers 1631 are "MIDDLE" and "LOW", and (iii) the current highest user level is "MIDDLE".

Having acknowledged the current highest user level, the countermeasure determining unit 1800 retrieves the countermeasure information 1610 stored in the countermeasure information storage 1650 and determines the countermeasure procedure 1613 to be performed.

More specifically, with the informed apparatus status 1611 being "RECORDING", and with the highest user level 1612 being "MIDDLE", the countermeasure determining unit 1800 determines that the countermeasure procedure 1613 to be taken is "MESSAGE 12".

The countermeasure determining unit 1800 accordingly performs the determined countermeasure procedure 1613.

For example, when the highest user level 1612 among the at-home users is "HIGH", the countermeasure determining unit 1800 provides the message output unit 1931 of the countermeasure unit 1900 with the corresponding message number 1621, namely "11" in this case, and instructs the message output unit 1931 to display the corresponding message 1622.

Following the instruction, the message output unit 1931 displays the message 1622 in correspondence with the provided message number 1621 (i.e., "11") (Step S122, see FIG. 5).

If the highest user level 1612 among the at-home users is "MIDDLE" or "LOW", the countermeasure determining unit 1800 stops the recording process and then instructs the HDD shutdown unit 1937 of the countermeasure unit 1900 to shut down all access to the HDD.

As instructed, the HDD shutdown unit 1937 makes the HDD inaccessible (Step S123).

Next, the countermeasure determining unit 1800 provides the message output unit 1931 with the message number 1621, namely "12" in this case, and instructs the message output unit 1931 to display the corresponding message 1622.

The message output unit 1931 accordingly displays the message 1622 corresponding to the provided message number 1621 (i.e., "12") (Step S124, see FIG. 5).

The user who has seen the message carries out a proper countermeasure according to the displayed message.

<3. Process During BD Playback>

Figure 15:
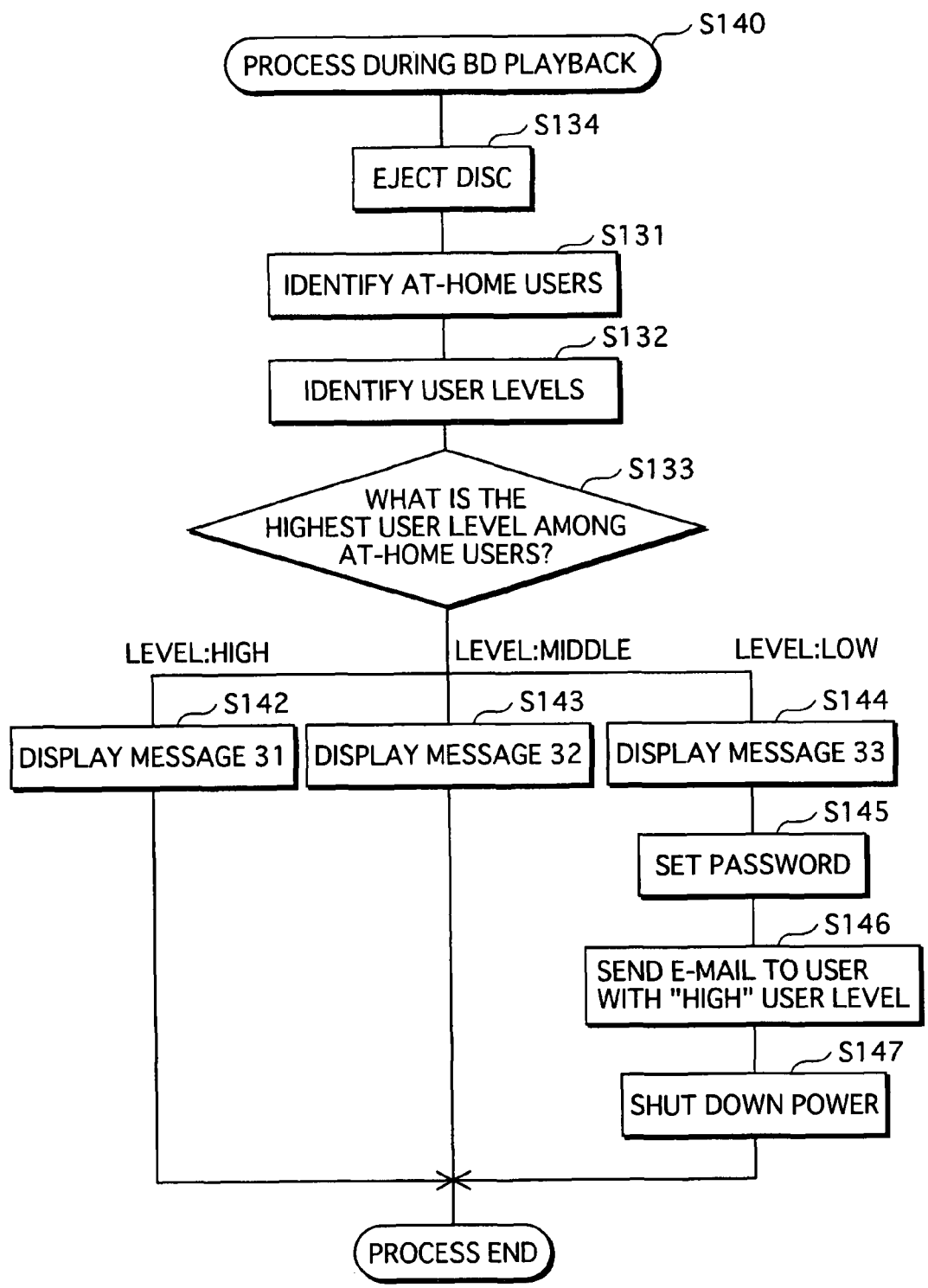
FIG. 15 is a flowchart illustrating a process that is performed while a Blu-ray disc (BD) is being played back.

Described below with reference to FIG. 15 is the process that is performed while the BD is being played back. FIG. 15 is a flowchart illustrating the process that is performed while the BD is being played back.

The description below is given under the following assumption: the virus detector 1100 detects the virus on February 13 at 17:00.

First, the recording apparatus status monitor 1200 informs the countermeasure determining unit 1800 that the apparatus status is "PLAYING BD". Accordingly, the countermeasure determining unit 1800 instructs the disc ejector 1938 of the countermeasure unit 1900 to eject the BD.

As instructed, the disc ejector 1938 stops the BD playback and ejects the BD (Step S134).

Then the countermeasure determining unit 1800 identifies (i) users who are currently at home (Step S131), (ii) the user levels of the at-home users (Step S132) and (iii) the highest user level among the at-home users (Step S133).

The above Steps are the same as the Steps S131, S132 and S133 in FIG. 10.

With the current time being 17:00, the countermeasure determining unit 1800 acknowledges that (i) two users, namely "User 02" and "User 03" are currently at home, (ii) the user levels 1632 corresponding to the user identifiers 1631 are "MIDDLE" and "LOW", and (iii) the current highest user level is "MIDDLE".

Once having acknowledged the highest user level, the countermeasure determining unit 1800 retrieves the countermeasure information 1610 stored in the countermeasure information storage 1650, and accordingly determines the proper countermeasure procedure 1613 to be carried out.

To be specific, with the informed apparatus status 1611 being "PLAYING BD", and with the current highest user level 1612 being "MIDDLE" in this case, the countermeasure determining unit 1800 determines "MESSAGE 32" to be the countermeasure procedure 1613 to be carried out.

Accordingly, the countermeasure determining unit 1800 carries out the determined countermeasure procedure 1613.

For example, when the highest user level 1612 among the at-home users is "HIGH", the countermeasure determining unit 1800 provides the message output unit 1931 with the corresponding message number 1621, namely "31" in this case, and instructs the message output unit 1931 to display the corresponding message 1622.

As instructed, the message output unit 1931 displays the message 1622 that corresponds to the provided message number 1621 (i.e., "31") (Step S142, see FIG. 5).

When the highest user level 1612 among the at-home users is "MIDDLE", the countermeasure determining unit 1800 provides the message output unit 1931 with the corresponding message number 1621, namely "32" in this case, and instructs the message output unit 1931 to display the corresponding message 1622.

As instructed, the message output unit 1931 displays the message 1622 that corresponds to the provided message number 1621 (i.e., "32") (Step S143, see FIG. 5).

When the highest user level 1612 among the at-home users is "LOW", the countermeasure determining unit 1800 provides the corresponding message number 1621, namely "33" in this case, and instructs the message output unit 1931 to display the corresponding message 1622.

As instructed, the message output unit 1931 displays the message 1622 that corresponds to the provided message number 1621 (i.e., "33") (Step S144, see FIG. 5).

Next, the countermeasure determining unit 1800 instructs the password setting unit 1939 to configure the settings for password-related operations. Here, the password is a character string that is newly set by the countermeasure determining unit 1800. This character string is hereafter referred to as a "password character string".

Following the instruction, the password setting unit 1939 sets the password in form of the password character string, and rejects any inputs other than the password (Step S145). Here, the password setting unit 1939 configures the settings such that the password entry screen is displayed when the power of the recording apparatus 1000 is turned on.

After giving the aforementioned instruction to the password setting unit 1939, the countermeasure determining unit 1800 sends the user of the highest user level an E-mail that includes the newly set password character string.

More specifically, the countermeasure determining unit 1800 retrieves the user level information 1630 stored in the user information storage 1600, and selects the user E-mail address 1633 that corresponds to the highest user level 1632.

The countermeasure determining unit 1800 provides the E-mail sender 1932 with the selected user E-mail address 1633 and the password character string, and instructs the E-mail sender 1932 to send the E-mail.

As instructed, the E-mail sender 1932 sends the E-mail to the provided user E-mail address 1633, the E-mail including the password character string and notifying the user that the recording apparatus 1000 was infected by the virus during the BD playback (Step S146).

For example, the E-mail sender 1932 sends the E-mail including the password character string to the user E-mail address 1633 (i.e., "User01@xxx.or.jp") corresponding to the highest user level 1632 (i.e., "HIGH") (see FIG. 6).

Once the above Steps are completed, the countermeasure determining unit 1800 instructs the power shutdown unit 1935 to shut down the power of the recording apparatus 1000 (Step S147).

Accordingly, the power shutdown unit 1935 shuts down the power of the recording apparatus 1000.

Second Embodiment

Overview

The First Embodiment has discussed the post-virus-infection countermeasures to recover the recording apparatus. The Second Embodiment explains proactive measures to make the recovery countermeasures easier.

The following describes two of such proactive measures.

The first proactive measure is to, in the case where a certain apparatus downloads contents and the like from the Internet, pre-backup information that requires protection.

The second proactive measure is to keep other apparatuses disconnected from the network while a certain apparatus is downloading the contents and the like from the Internet.

The first proactive measure is advantageous especially when the information is already corrupted at the time of virus detection; in such a case, the information can be recovered by taking the first proactive measure. The second proactive measure is advantageous especially when the recording apparatus is infected by a virus that will rapidly spread to other computers; in such a case, by taking the second proactive measure, the virus can be removed before other computers get infected by the virus.

Both, or either one of these proactive measures may be performed.

The following describes features of the Second Embodiment that are different from those of the First Embodiment.
<Structure>

Figure 16:
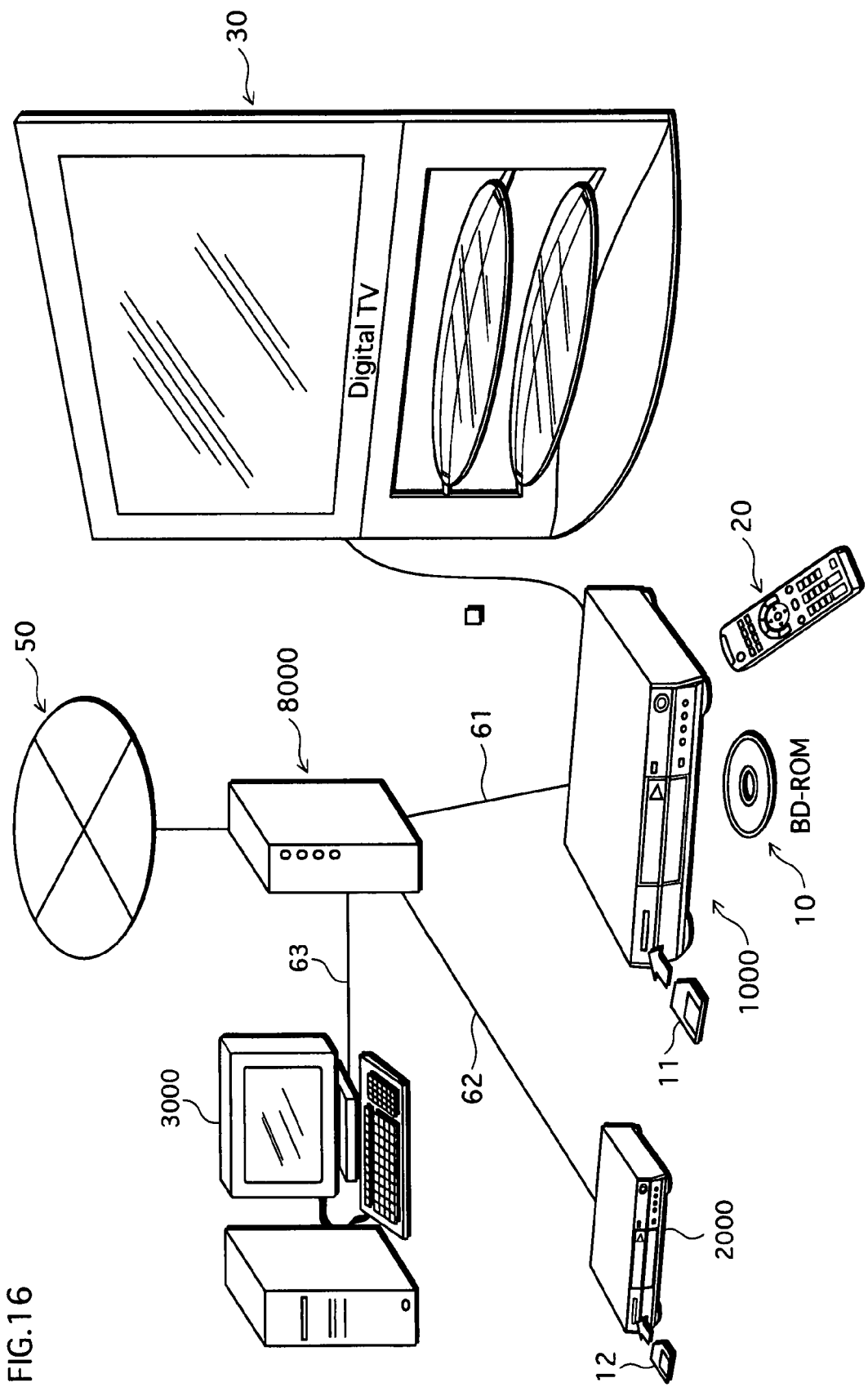
FIG. 16 is a diagram illustrating an example process of a second embodiment being performed with use of the processing apparatus of the present invention.

FIG. 16 is a diagram illustrating an example process of the second embodiment being performed with use of the processing apparatus of the present invention.

FIG. 16 is the same as FIG. 1, except that the home network, which connects each processing apparatus including the recording apparatus 1000, is a bus network in FIG. 1, but is a star network in FIG. 16.

As seen in the following description, the present embodiment incorporates the star network centralized by a router 8000.

In FIG. 16, the personal computer 3000, the recording apparatus 1000 and the recording apparatus 2000 are each connected to a router 40 via connecting cords (61, 62 and 63), and are each further connected to the Internet 50 via the router 40.

Figure 17:
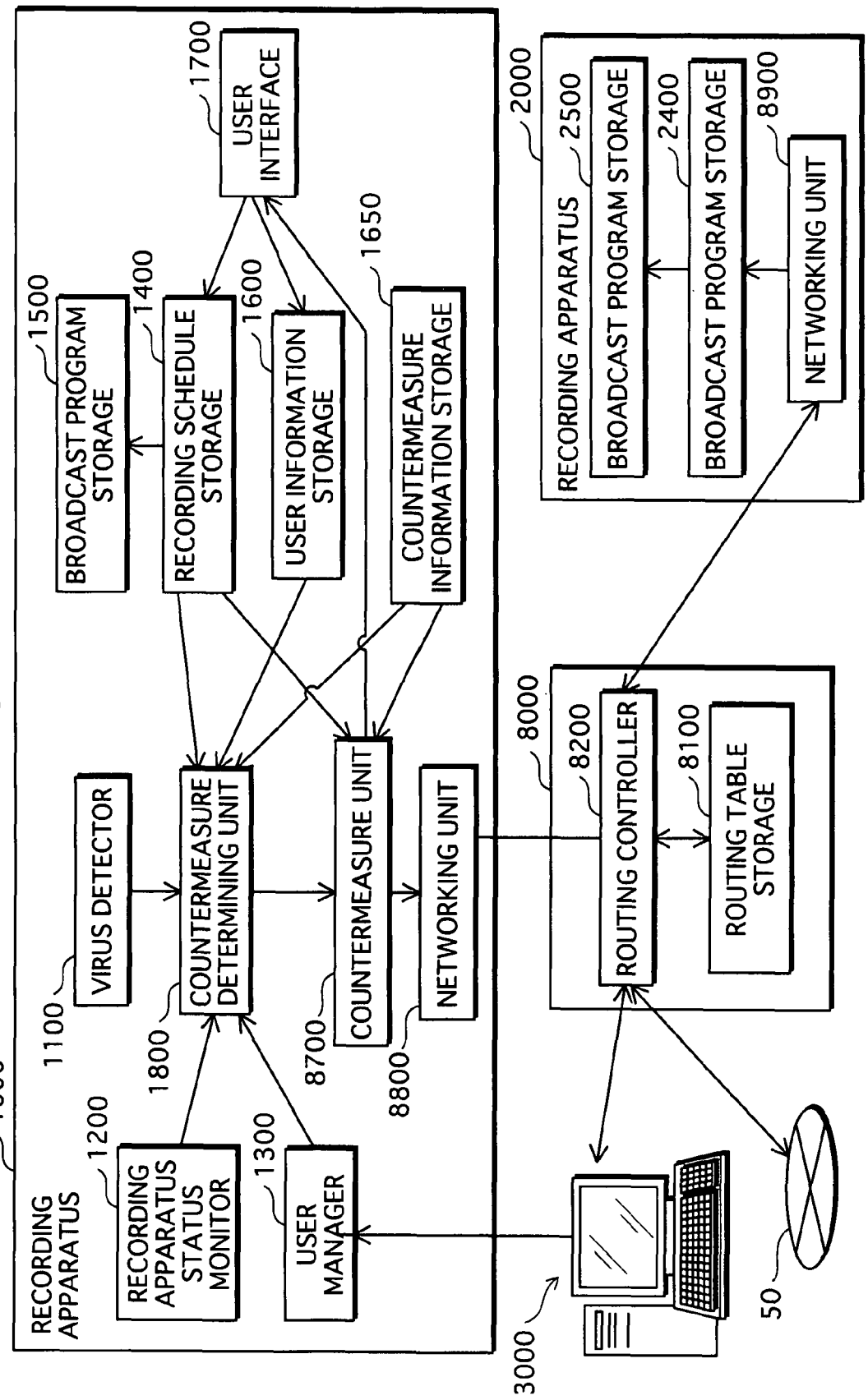
FIG. 17 is a functional block diagram illustrating the structures of a recording apparatus and the like of the second embodiment.
Figure 18:
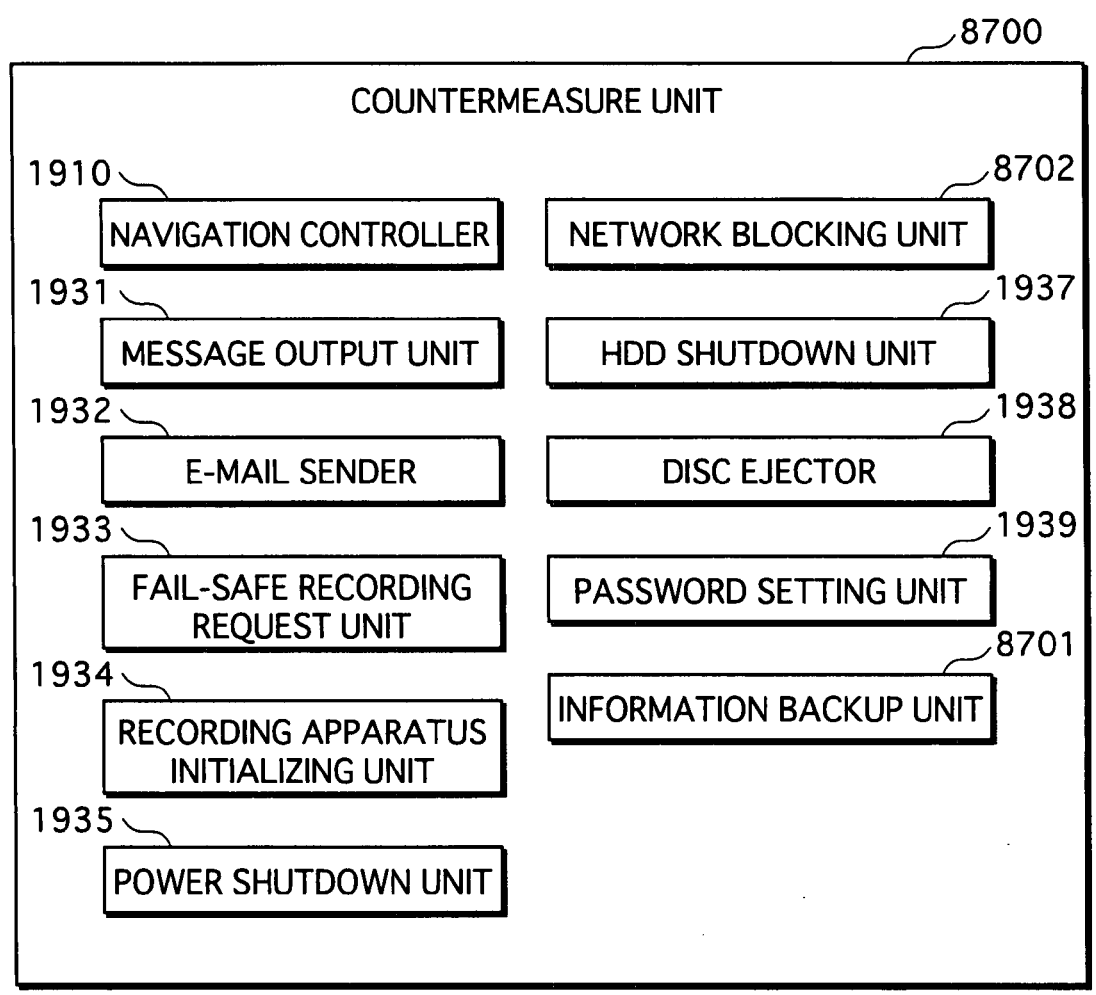
FIG. 18 is a functional block diagram illustrating the structure of a countermeasure unit 8700 of the second embodiment.

FIG. 17 is a functional block diagram illustrating the structures of a recording apparatus and the like of the second embodiment. FIG. 18 is a functional block diagram illustrating the structure of the countermeasure unit 8700 of the second embodiment.

Among all functional members of the apparatuses of the present embodiment, the following are different from those of the First Embodiment: the countermeasure unit 8700 and the networking unit 8800 of the recording apparatus 1000; the networking unit 8900 of the recording apparatus 2000; and the router 8000.

Specifically, the countermeasure unit 8700 additionally includes an information backup unit 8701 that is necessary in the present embodiment. A network blocking unit 8702 of the present embodiment also has an additional function.

The information backup unit 8701 can save information that must maintain its contents unaltered by the virus into an apparatus, medium, or other storage means that are predesignated. It is regarded that a user predesignates (i) the apparatus into which the information is saved, (i) the information to be saved, and so on.

As with the network blocking unit 1936 of the First Embodiment, the network blocking unit 8702 of the present embodiment can disconnect the recording apparatus 1000 from the network. In addition, the network blocking unit 8702 can issue an instruction to other apparatuses other than the recording apparatus 1000 to cut off or re-establish their connection to the network.

The networking units (1950 and 2600) of the First Embodiment have such functions as establishing/disconnecting a connection with the network and exchanging data with other apparatuses. However, the networking units (8800 and 8900) of the present embodiment do not have the function of disconnecting the connection with the network.

That is, instructions issued by the networking unit 1936 are sent to the router 8000 via the networking unit 8800.

In addition to the functions that normal routers have, the router 8800 of the present invention has unique functions of its own. Specifically, the router 8800 includes a routing table storage 8100 and a routing controller 8200.

Like normal routers, the routing table storage 8100 stores therein an address of an apparatus. The routing table storage 8100 additionally stores therein a connection status of the apparatus.

In addition to the routing function that normal routers have, the routing controller 8200 has a function of sending packets in accordance with the connection status of a destination apparatus to which the packets are sent.
<Data>

FIG. 19 is a table showing the structure and example contents a connection status management table 8110.

The connection status management table 8110 is stored in the routing table storage 8100.

The connection status management table 8110 includes: an apparatus name 8111; an apparatus address 8112; and a connection status 8113.

The apparatus name 8111 is an identifier of an apparatus that is managed by the router 8000. The apparatus address 8112 is an address of the apparatus.

The connection status 8113 is a connection status of an apparatus that is indicated by the apparatus name 8111. The apparatus is set with either one of the following two connection statuses: "CONNECTED" or "DISCONNECTED"

The routing controller 8200 sends packets to the apparatus address 8112 of the apparatus whose connection status is "CONNECTED". The routing controller 8200 does not send packets to the apparatus address 8112 of the apparatus whose connection status is "DISCONNECTED".

The connection status 8113 is set by the network blocking unit 8702 of the countermeasure unit 8700.
<Operation>
<Proactive Measure 1>

The following describes a proactive measure to, in the case where a certain apparatus downloads contents and the like from the Internet, pre-backup information that requires protection.

The aforementioned information that requires protection may be information stored in the certain apparatus that downloads contents, or may be information stored in other apparatuses.

This proactive measure can be taken when, for example, pre-backuping information that is stored in a BD player/ recorder and requires protection, before downloading contents using BD-Java (registered trademark).

First, a user controls the user interface 1700 so as to download contents from the Internet to the recording apparatus 1000.

Prior to the actual downloading of the contents, the user interface 1700 informs the countermeasure unit 1900 that the user interface 1700 has been instructed to download the contents.

Accordingly the countermeasure unit 1900 instructs the information backup unit 8701 to save predesignated information, such as recording schedule information stored in the recording schedule storage 1400, into a designated apparatus.

After retrieving the predesignated information, the information backup unit 8701 saves the predesignated information to the designated apparatus via the networking unit 8800.

When it is predesignated to save information stored in other apparatuses as well, the countermeasure unit 1900 instructs other apparatuses to save the information to the designated apparatus as well.

When the saving of the predesignated information is completed, the information backup unit 8701 instructs the network blocking unit 8702 to disconnect the apparatus to which the predesignated information has been saved from the network.

The network blocking unit 8702 instructs, via the networking unit 8800, the routing controller 8200 to disconnect the apparatus from the network.

The routing controller 8200 accordingly sets the connection status of the apparatus as "DISCONNECTED". For example, when "PERSONAL COMPUTER 3000" (device name 8111) is the apparatus to which the predesignated information is saved to, the routing controller 8200 sets the corresponding connection status 8113 as "DISCONNECTED".

Once the apparatus is off the network, the information backup unit 8701 informs the countermeasure unit 8700 that the predesignated information has been saved. Similarly, the countermeasure unit 8700 notifies the user interface 1700 that the predesignated information has been saved.

Following the above notification, the user interface 1700 starts the normal process to download the contents.

If the apparatus to which the predesignated information is saved is disconnected from the network in the first place, the information backup unit 8701 instructs the network blocking unit 8702 to connect the apparatus to the network. After the connection is established, the information backup unit 8701 saves the predesignated information to the apparatus.

<Proactive Measure 2>

Described below is a proactive measure to keep other apparatuses disconnected from the network while a certain apparatus is downloading the contents and the like from the Internet.

First, a user controls the user interface 1700 so as to download contents from the Internet to the recording apparatus 1000. Before performing a normal process to download the contents, the user interface 1700 informs the countermeasure unit 1900 that the recording apparatus 1000 has been instructed to download the contents.

Accordingly the countermeasure unit 1900 instructs the network blocking unit 8702 to disconnect all apparatuses other than the recording apparatus 1000 (i.e., the apparatus the countermeasure unit 1900 is embedded in) from the network.

The network blocking unit 8702 specifies all the apparatuses other than the recording apparatus 1000, and instructs, via the networking unit 8800, the routing controller 8200 to disconnect these specified apparatuses from the network.

As instructed, the routing controller 8200 sets the connection statuses of the specified apparatuses as "DISCONNECTED". For example, if the countermeasure unit 1900 is embedded in the recording apparatus 1000, the routing controller 8200 sets the connection statuses 8113 of all other apparatuses, including the recording apparatus 2000 and the personal computer 3000, as "DISCONNECTED".

The information backup unit 8701 informs the countermeasure unit 8700 that the predesignated apparatus is disconnected from the network. Similarly, the countermeasure unit 8700 notifies the user interface 1700 that the predesignated apparatus is disconnected from the network.

Following the above notification, the user interface 1700 starts a normal process to download the contents.

Upon finishing the download, the user interface 1700 informs the countermeasure unit 8700 that the download is finished. The countermeasure unit 8700 accordingly instructs the network blocking unit 8702 to reconnect all the apparatuses to the network.

As instructed, the network blocking unit 8702 specifies all the apparatus to be connected to the network, and instructs, via the networking unit 8800, the routing controller 8200 to connect these apparatus to the network.

Accordingly the routing controller 8200 sets the connection statuses of all these apparatuses as "CONNECTED".

<Additional Remarks>

The above is a description of the processing apparatus of the present invention based on the embodiments as set forth herein. The present invention can also be realized with a partially altered version of the processing apparatus. The above embodiments are not intended to limit the present invention.

(1) In the First Embodiment, the procedure for taking the countermeasure when the virus is detected in the recording apparatus 1000 is different depending on the status of the recording apparatus 1000 and the user's knowledge about the processing apparatus and the virus. Such a procedure may be different depending on any combination of (i) the status of the recording apparatus 1000, (ii) the user's knowledge about the processing apparatus and (iii) a type of the detected virus.

In the above case where the type of the detected virus is added as criteria for performing such a procedure, the virus detector 1100 informs the countermeasure determining unit 1800 of information, such as the type of the detected virus, before the countermeasure to be taken is determined.

(2) The star network, used as the home network in the Second Embodiment, may be replaced by the bus network and the like.

When the star network is used, the router 8000 controls connection statuses of each apparatus. On the other hand, when the bus network is used, the countermeasure unit 8700 instructs each one of apparatuses to disconnect themselves from the network. Accordingly, the networking unit 8800 embedded in each one of apparatuses cuts the network connection. In this case, each one of apparatuses whose connection to the network has been cut needs to reestablish the connection by itself.

(3) It is permissible to record, onto a recording medium, a program that causes a CPU to execute controlling processes, which realize each function of the processing apparatus described in the above embodiments. It is also permissible to distribute such a program via various types of communication path. Examples of the recording medium include an IC card, an optical disc, a flexible disk, a ROM, and a flash memory. The distributed program is stored in a CPU readable memory or the like in an apparatus before it is actually used. Each function of the processing apparatus is realized with the CPU executing the program.

(4) Each of the function blocks of the countermeasure determining unit 1800 and the countermeasure unit 1900 in the recording apparatus 1000 may be typically realized as an LSI, which is an integrated circuit. Each of these function blocks may be separately accumulated as an individual chip. Or, part of, or all of these function blocks may be included on one chip.

Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

If a semiconductor technology or related technologies give birth to a new circuit-integrating technology that would replace the LSI, such technologies may be used for integrating the functional blocks. One such possibility is an application of biotechnology.

The present invention is advantageous especially when used in an apparatus that has a possibility of getting infected by a computer virus, in the case where the apparatus performs a computer virus-handling process in accordance with difference users.

The invention claimed is:

1. A processing apparatus having a content recording/playback function and being connected to a network, the processing apparatus comprising:
    a processor;
    a detection unit operable to detect a computer virus;
    an apparatus status retrieval unit operable to retrieve one of statuses of a recording/playback process;
    a countermeasure storage unit storing therein, in correspondence, (i) the statuses of the recording/playback process and (ii) computer virus-handling processes to be performed if the detection unit detects the computer virus; and
    a countermeasure unit operable to, if the detection unit detects the computer virus, perform, using the processor, one of the computer virus-handling processes that corresponds with the retrieved one of the statuses of the recording/playback process,
    wherein the statuses of the recording/playback process include a recording scheduled status that is a status where a recording has been scheduled, and
    wherein one of the computer virus-handling processes that is stored, in correspondence with the recording scheduled status, in the countermeasure storage unit is a process to send recording schedule information indicating the recording scheduled status to another recording apparatus and request the another recording apparatus to perform the scheduled recording.

2. An integrated circuit in a processing apparatus having a content recording/playback function and being connected to a network, the integrated circuit comprising:
    a detection unit operable to detect a computer virus;
    an apparatus status retrieval unit operable to retrieve one of statuses of a recording/playback process;
    a countermeasure storage unit storing therein, in correspondence, (i) the statuses of the recording/playback process and (ii) computer virus-handling processes to be performed if the detection unit detects the computer virus; and
    a countermeasure unit operable to, if the detection unit detects the computer virus, perform one of the computer virus-handling processes that corresponds with the retrieved one of the statuses of the recording/playback process,
    wherein the statuses of the recording/playback process include a recording scheduled status that is a status where a recording has been scheduled, and
    wherein one of the computer virus-handling processes that is stored, in correspondence with the recording scheduled status, in the countermeasure storage unit is a process to send recording schedule information indicating the recording scheduled status to another recording apparatus and request the another recording apparatus to perform the scheduled recording.

* * * * *